US011775144B2

(12) United States Patent
McKenzie et al.

(10) Patent No.: US 11,775,144 B2
(45) Date of Patent: Oct. 3, 2023

(54) PLACE-BASED SEMANTIC SIMILARITY PLATFORM

(71) Applicant: Salesforce, Inc., San Francisco, CA (US)

(72) Inventors: Grant McKenzie, Montreal (CA); Sarah E. Battersby, Seattle, WA (US); Vidya Raghavan Setlur, Portola Valley, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/986,822

(22) Filed: Nov. 14, 2022

(65) Prior Publication Data

US 2023/0152941 A1    May 18, 2023

Related U.S. Application Data

(60) Provisional application No. 63/285,476, filed on Dec. 2, 2021, provisional application No. 63/279,667, filed on Nov. 15, 2021.

(51) Int. Cl.
*G06F 3/0482* (2013.01)
*G06T 11/20* (2006.01)
(Continued)

(52) U.S. Cl.
CPC ............ *G06F 3/0482* (2013.01); *G06F 40/30* (2020.01); *G06T 11/206* (2013.01); *G06F 3/04847* (2013.01); *G06T 2200/24* (2013.01)

(58) Field of Classification Search
CPC .... G06F 3/0482; G06F 40/30; G06F 3/04847; G06T 11/206; G06T 2200/24
(Continued)

(56) References Cited

U.S. PATENT DOCUMENTS 7,800,613 B2 * 9/2010 Hanrahan ............. G06T 11/206
345/440
8,022,952 B2 * 9/2011 Hao ....................... G06T 11/206
345/440
(Continued)

OTHER PUBLICATIONS

Anonymous, "Jensenn-Shannon divergence," Oct. 28, 2021, Retrieved from the Internet: https://en.wikipedia.org/w/index.php?title=Jensen-Shannon_divergence&oldid=1052311859, 6 pgs.
(Continued)

*Primary Examiner* — William D Titcomb
(74) *Attorney, Agent, or Firm* — Morgan, Lewis & Bockius LLP

(57) ABSTRACT

A method provides visual analysis of datasets. The method is performed at a computer system. A user selects a data source. In response, the system presents a natural language interface for analysis of data in the data source and presents a map data visualization within the graphical user interface for selecting geospatial data points from the data source. In response to receiving a first user input to select a first set of one or more geographic regions, the system calculates the similarity between the first set of one or more geographic regions and a second set of one or more geographic regions, based on a range of socio-economic, demographic, and/or geographic data fields from the data source, using one or more statistical techniques (e.g., Jensen-Shannon Divergence (JSD)). The system then updates and displays the map data visualization according to the calculated similarity.

20 Claims, 44 Drawing Sheets

(51) Int. Cl.
*G06F 40/30* (2020.01)
*G06F 3/04847* (2022.01)

(58) Field of Classification Search
USPC .......................................................... 715/730
See application file for complete search history.

(56) References Cited

U.S. PATENT DOCUMENTS

| | | | | |
|---|---|---|---|---|
| 10,444,941 | B2* | 10/2019 | Cervelli | G06T 11/60 |
| 10,515,121 | B1* | 12/2019 | Setlur | G06F 16/90332 |
| 10,664,570 | B1* | 5/2020 | Clark | G16H 40/63 |
| 10,817,527 | B1* | 10/2020 | Setlur | G06F 16/90332 |
| 11,348,125 | B2* | 5/2022 | Rao | G06F 3/0482 |
| 2006/0206512 | A1* | 9/2006 | Hanrahan | G06T 11/206 |
| | | | | 707/999.102 |
| 2012/0089920 | A1* | 4/2012 | Eick | G06T 11/206 |
| | | | | 715/739 |
| 2015/0007074 | A1* | 1/2015 | Mackinlay | G06T 11/00 |
| | | | | 715/765 |
| 2019/0065565 | A1* | 2/2019 | Stolte | G06F 16/2282 |
| 2020/0058067 | A1* | 2/2020 | Parker | G06Q 40/00 |
| 2020/0410728 | A1 | 12/2020 | Chen | |
| 2021/0165771 | A1* | 6/2021 | Papazian | G06F 16/212 |
| 2022/0019337 | A1* | 1/2022 | Natali, Jr. | G06F 3/04842 |
| 2022/0108507 | A1* | 4/2022 | Degtyar | G01C 21/3878 |

OTHER PUBLICATIONS

Kahlores, "Choropleth map," Jun. 28, 2021, Retrieved from the Internet, https://en.wikipedia.org/w/index.php?title=Choropleth_map&oldid=1030845735, 10 pgs.

Salesforce, Inc, International Search Report and Written Opinion, PCT/US2022/079906, Feb. 22, 2023, 20 pgs.

* cited by examiner

This XML file does not appear to have any style information associated with it. The document tree is shown below.

```xml
-<params>
  <query>
    <geography>Census Tracts</geography>
    <param>DENSITY < 100</param>
  </query>
  -<locations>
    <location name="San Francisco" latitude="37.774929" longitude="-122.419418" zoom="12"/>
    <location name="Chula Vista" latitude="32.606989" longitude="-117.051169" zoom="12"/>
  </locations>
  -<presets>
    -<preset>
      <name>My Preset</name>
      -<dimensions>
        <dimension data="acs" name="race" weight="80"/>
        <dimension data="acs" name="age" weight="80"/>
        <dimension data="acs" name="income" weight="80"/>
        <dimension data="acs" name="education" weight="80"/>
        <dimension data="acs" name="commute" weight="80"/>
        <dimension data="geo" name="proximity" weight="1"/>
      </dimensions>
    </preset>
  </presets>
</params>
```

Figure 24

PLACE-BASED SEMANTIC SIMILARITY PLATFORM

CROSS-REFERENCE TO RELATED APPLICATIONS

This application claims priority to U.S. Provisional Application Ser. No. 63/279,667, filed Nov. 15, 2021, entitled "Place-Based Semantic Similarity Platform," and U.S. Provisional Application Ser. No. 63/285,476, filed Dec. 2, 2021, entitled "Place-Based Semantic Similarity Platform," each of which is incorporated by reference herein in its entirety.

TECHNICAL FIELD

The disclosed implementations relate generally to data visualization, and more specifically to systems, methods, and user interfaces of providing place-based semantic similarity.

BACKGROUND

Similarity between objects is intuitively defined. A tree is similar to a bush because they are both plants. However, the tree is dissimilar to an apartment building, although height is often used to describe them both. At its core, understanding what makes things similar is quite complex and nuanced. For instance, researchers have investigated the concept of similarity with the goal of breaking it down into features and the ways that people individually understand and assess similarity.

While comparisons between objects like trees, bushes, and apartment buildings may seem like obvious and intuitive assessments, it is not as easy to identify similarity when working with varied socio-demographic characteristics like race, age, and income. It also depends on the context and what is important to the individual interpreting similarity. In terms of these characteristics, what region of the United States is most similar to San Francisco and how? What neighborhoods in Chicago are most similar to the Bronx, N.Y. in terms of racial make-up?

What other locations are like a neighborhood? How? Why? The heart of many spatial analyses is finding similarity or dissimilarity between locations. Discovering patterns and interpreting similarity is a complicated process based on both the spatial characteristics and the semantics or meaning assigned to a place. Human conceptualization of similarity for locations is multi-faceted and cannot be captured with a simple assessment of single numeric attributes like population density or median income. However, these quantifiable attributes are the basis for an initial pass of sense-making.

One difficulty with measuring similarity using socio-economic and demographic variables is the huge volume and variety of data available. In traditional demographic work, researchers may cherry-pick a few simple variables, such as median income or age, and use them as independent variables in their statistics to identify correlations. Sometimes researchers look at one attribute at a time by comparing all possible geographic locations in terms of whether the value is higher or lower between those locations (e.g., census tract A has a 10% larger population than census tract B). However, neither of these methods uses relationships of data across potentially large groupings of demographic variables.

SUMMARY

Accordingly, there is a need for systems, methods, and interfaces that facilitate incorporation of similarity measures and spatial analytics to provide information reduction and/or semantic generalization. The techniques described herein help bring a user closer to actionable insights. The techniques can be used in geospatial inquiries to determine similarity between regions, where participants can manipulate individual weights of various attributes describing these locations. Some implementations use context and additional place-specific parameters for computing similarity. Some implementations provide geospatial analysis tools that make use of the nuances of semantics for place similarity.

Some implementations use a statistical approach to determine similarity between geographic regions (e.g., regions within the United States). Some implementations provide a data hub, which makes it easy for users to incorporate this type of similarity measurement in their analysis. Frameworks according to the techniques described herein make it easy for people to work with varied attributes from the United States census to identify locations that are more or less similar using the attributes that users are interested in. Some implementations determine similarity using computations based on Jensen-Shannon Divergence (JSD), and/or present the results in an easy-to-read map. Some implementations show details on-demand in tooltips. The use of JSD for assessing similarity for data analytics is described in detail below, according to some implementations.

According to some implementations, a method is provided for visual analysis of datasets. The method is performed at a computer system. A user selects a data source. In response, the system presents a graphical user interface for analysis of data in the data source. The data includes geospatial data points. The system also presents a map data visualization within the graphical user interface. The map data visualization includes a plurality of geographic regions. Each geographic region corresponds to a respective one or more geospatial data points. In response to receiving a first user input to select a first set of one or more geographic regions of the plurality of the geographic regions, the system calculates the similarity between the first set of one or more geographic regions and a second set of one or more geographic regions of the plurality of geographic regions, based on a set of attributes (e.g., data fields from the data source), using one or more statistical techniques. The system then updates and displays the map data visualization according to the calculated similarity.

In some implementations, the set of attributes includes one or more socio-economic, demographic, and geographic variables.

In some implementations, updating the map data visualization includes highlighting or lowlighting at least one geographic region of the second set of one or more geographic regions.

In some implementations, the method further includes, in response to receiving a second user input to select coordinates for a search polygon on the map data visualization, defining the second one or more regions based on the coordinates.

In some implementations, the method further includes comparing the coordinates for the search polygon to a corresponding one or more geospatial data points for each of the geographic regions of the plurality of geographic regions, to identify the second set of one or more geographic regions.

In some implementations, each attribute of the set of attributes is associated with a corresponding weight of a plurality of weights, and the method further includes calculating the similarity based on the plurality of weights.

In some implementations, the method further includes providing one or more affordances, each affordance corresponding to a respective attribute of the set of attributes.

In some implementations, the method further includes, in response to receiving a second user input to select a first affordance of the one or more affordances: (i) adjusting a first weight for a first attribute corresponding to the first affordance to obtain an updated set of weights; (ii) calculating an updated similarity between the first set of one or more geographic regions and the second set of one or more geographic regions, based on the updated set of weights, using the one or more statistical techniques; and (iii) updating and displaying the map data visualization according to the updated similarity.

In some implementations, the method further includes providing a store affordance to store the updated set of weights. In response to a user selecting the store affordance, the method stores the updated set of weights in a preset file for a next session.

In some implementations, the method further includes, for the next session, retrieving the preset file and using the updated set of weights for calculating the similarity between the first set of one or more geographic regions and the second set of one or more geographic regions.

In some implementations, the map data visualization is a choropleth map, and updating and displaying the map data visualization according to the calculated similarity includes displaying a gradient from most to least similarity.

In some implementations, the method further includes: (i) providing a first affordance to select a choropleth map and a second affordance to select a most-least map; (ii) in response to user selection of the first affordance, displaying a gradient from most to least similarity; and (iii) in response to a user selection of the second affordance, displaying the most similar and the least similar regions.

In some implementations, the method further includes: (i) providing a plurality of affordances, each affordance corresponding to a respective maximum number of regions; and (ii) in response to a user selection of an affordance of the plurality of affordances, displaying the most similar and the least similar regions within the second set of one or more regions based on the maximum number of regions corresponding to the affordance.

In some implementations, the method further includes: (i) providing a plurality of affordances, each affordance corresponding to a respective subset of subregions of the plurality of subregions; and (ii) in response to user selection of an affordance of the plurality of affordances, (a) ceasing to present the map data visualization and (b) presenting an alternate map data visualization within the graphical user interface. The alternate map data visualization includes a subset of subregions corresponding to the affordance.

In some implementations, the graphical user interface includes a first portion and a second portion, and the method further includes: (i) displaying the map data visualization in the first portion; and (ii) displaying a summary of the similarity between the first one or more geographic regions and the second one or more geographic regions in the second portion.

In some implementations, each of the geographic regions corresponds to a respective census tract.

In some implementations, calculating the similarity includes computing a semantic similarity matrix for the first set of one or more geographic regions and the second set of one or more geographic regions of the plurality of geographic regions, for the set of attributes.

In some implementations, calculating the similarity includes computing Jensen-Shannon Divergence (JSD) between pairs of geographic regions of the first set of one or more geographic regions and the second set of one or more geographic regions.

In another aspect, an electronic device includes one or more processors, memory, a display, and one or more programs stored in the memory. The programs are configured for execution by the one or more processors and are configured to perform any of the methods described herein.

In another aspect, a non-transitory computer readable storage medium stores one or more programs configured for execution by a computing device having one or more processors, memory, and a display. The one or more programs are configured to perform any of the methods described herein.

Thus methods, systems, and graphical user interfaces are disclosed that allow users to efficiently explore data displayed within a data visualization application.

Both the foregoing general description and the following detailed description are exemplary and explanatory and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIG. 2 shows a graphical user interface with a help menu, according to some implementations.

FIGS. 3A, 3B, 4, 5, 6A-6C, 7A, 7B, 8-16, 17A, 17B, 18, 19, 20A, 20B, and 21-28 show examples of graphical user interfaces displaying maps, according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Estimates show that more than 80% of business datasets contain a spatial component (e.g., street address, latitude/ longitude, state, or country). The strong relationship of business data and location results in users frequently framing their questions and explorations around the spatial patterns in the data. While many of these user queries and interactions tie to absolute locations (e.g., "how many customers are in California?"), a wide range of important questions and avenues for exploration would benefit from additional flexibility in systems that are more in tune with semantics of place. This is not just true for business-related questions. Many decision-making opportunities involve evaluation of relationships between locations to provide context. The relationship between locations may be the answer in itself (e.g., "what places are like this one"), or the relationship may be a preliminary step in a larger analytic process (e.g., what places are like this one, so that I can use these locations in evaluating school district bussing policies"). The key to this type of question is similarity. Quantifying similarity, however, is challenging. Locations are more than simply a count of attributes, and the ways in which people understand relationships between locations is strongly tied to the character or semantic meaning that is attached to the locations.

Sense-making about the world is often contextual. The relative importance of a location is based largely on how that location compares to other locations. The contextual evaluation is based on what is "similar" or "different" as well as a metric for how similar or different. These metrics may be based on ordinal interpretation of visual patterns. For instance, what regions are lighter or darker on a map, or based on quantitative metrics of indexed values representing multidimensional similarity scores.

Figures 1, 1A:
FIGS. 1A-1 and 1A-2 show maps that display relative percent of different races in a particular location versus using similarity.
Figures 1, 1A, 2:
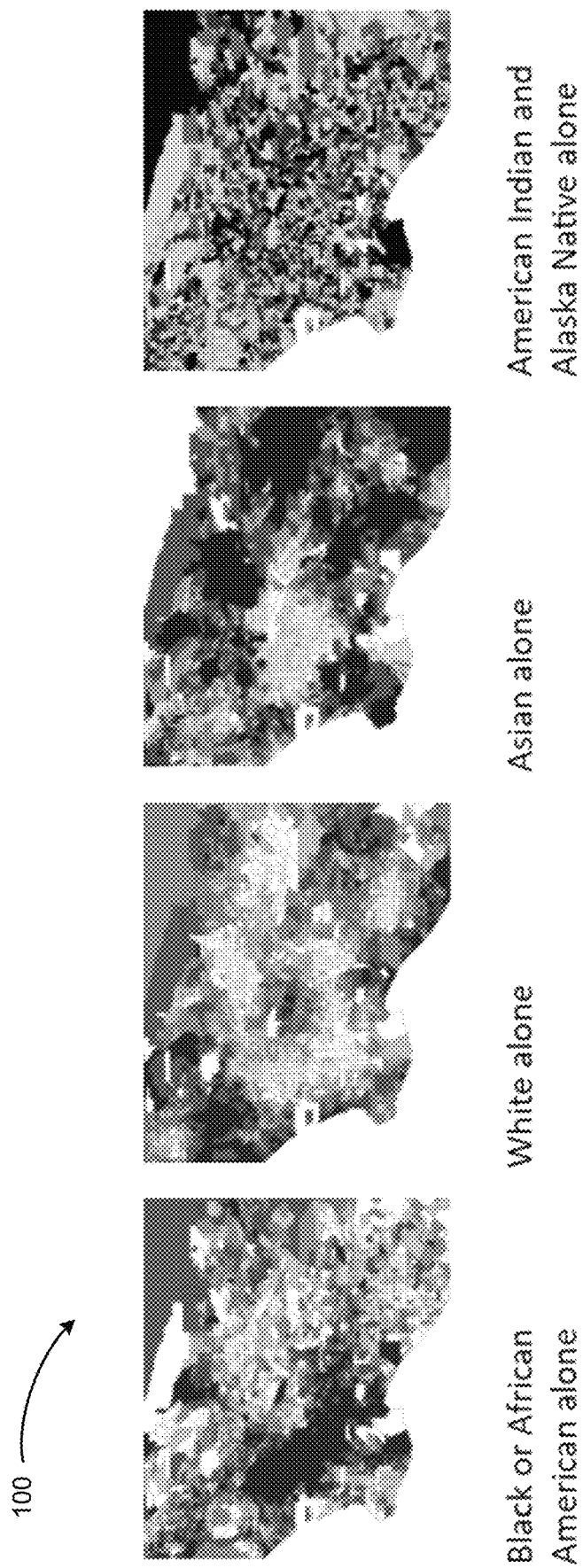

FIG. 1A-1 is a map that uses a single similarity measure comparing race distributions in a geospatial area. FIG. 1A-2 shows maps 100 that display relative percent of different races in same location as in FIG. 1A-1. If a user wanted to know about the similarity of the different places on the map, the user has to mentally combine each of these four maps and figure out which ones were most like the others. By combining each of these distributions into a single similarity measure, it is easy to see how they compare to one another, as shown in FIG. 1A-1.

Figure 1B:
FIG. 1B is an example of a map showing similarity using multiple attributes using Jenson-Shannon distance, according to some implementations.

FIG. 1B is an example of a map 102 showing similarity using multiple attributes using Jenson-Shannon distance, according to some implementations.

Even with a well-designed map to visualize patterns in attributes (e.g., data fields from a selected data source), assessing similarity between locations can be difficult. With a single attribute (e.g., percent of population that is Black or African American, as in FIG. 1A-2), a user can look for similarity between shades on the map as the indicator of similarity. For example, all of the census tracts shown in dark green could be considered similar. However, a reader's understanding of regions and their relationships often depends on numerous attributes, and it is virtually impossible to accurately identify similarity between locations when the reader must visually interpret patterns and then mentally aggregate them to assess similarity. While there are methods for visualizing small numbers of variables on single maps (e.g., bivariate or trivariate choropleth maps), the complexity of larger numbers of variables requires techniques described herein.

There are numerous intertwined challenges in helping people identify and easily explore similarity across multiple variables of interest. In addition to the general challenges of collecting appropriate data and calculating similarity, there is a broader issue of modeling similarity in a way that makes sense and allows people to tailor the calculation based on their intent. Spatial similarity as a concept is highly personal and influenced by what users can concretely measure, what users perceive about locations, and how users rate importance of the individual elements used to assess similarity. Even for calculations using the same general inputs (e.g., the attributes described herein), individuals may weight some of them to be more or less important than others when thinking about similarity.

Some implementations use models for spatial and attribute similarity. This allows for improved recommendations, for possible amendments to the query itself (e.g., the region Los Angeles versus the exact city boundary of Los Angeles in FIGS. 1A-1 and 1A-2) and also for expanding how users can be guided to related data. This may be through recommendations of similar datasets, or for analytical questions driven by the need to match characteristics of interest. For instance, a company may select a region with a subset of their top donors to assess the characteristics and then look for similar locations to target with their outreach or advertising activities. Some implementations use a place-similarity matrix to recommend other regions or potential candidates with similar place characteristics (e.g., similar socioeconomic demographics, or interests). These regions do not necessarily have to be near the original query location.

Some implementations provide a tool that consists of two components: a front-end interactive web platform and a back-end data store. A set of PHP web handlers pass data between the two components based on requests from the web client (for instance, when a user selects a census tract with a mouse). In some implementations, the front-end is an interactive web map built using the Leaflet framework and a series of DOM controls built using D3 and JQuery frameworks. In some implementations, the data is stored in a spatially-enabled (PostGIS) PostGreSQL database and is linked to census tract geometries using a unique census geographic identifier. In some implementations, the geographic boundaries (e.g., boundaries for census tracts) are stored as GeoJSON and layered on to the Leaflet base map on page load.

Example Data

The techniques described herein may be used to analyze any type of socio-economic and demographic data. For the sake of illustration, this section describes the application of the techniques for a census tract data from the 2019 American Community Survey (ACS). This includes 5-year estimates at the census tract level for the State of California, USA (sometimes referred to as the Census tract or the ACS data). The granularity of the Census tract is a logical resolution for analysis. Some implementations provide a tool for visual analysis of the data. The scaffolding of the tool is geography agnostic, allowing for these regions to be swapped out in place of higher (e.g., Census block groups) or lower (e.g., County) resolution geographies, if needed. The ACS data includes five dimensions: Age, Race, Income, Educational Attainment, and Mode of Commuting. Each of these dimensions is a distribution across a set of individual socio-economic or demographic attributes. For instance, in the Age dimension, there are estimates for the number of people aged 0-10, 10-15, 15-25, etc., for each of the Census tracts in California. In order to compare values across regions, some implementations normalize all attributes within a dimension, producing a numerical vector that sums to one for each dimension in each Census tract. The ACS data is exclusive and complementary, meaning that normalization is acceptable.

Some implementations calculate Euclidean distance between all pairs of Census tract geometries in the data. This allows users to control the influence of proximity in identifying similar regions. Population density is calculated for each Census tract as well as a Boolean value indicating whether or not a Census tract is within 20 miles of the coast. External data can be incorporated within the tool to allow more refined filtering.

Example Methods for Defining Similarity

Given the set of ACS data split into five dimensions, each containing a normalized vector of binned socio-economic or demographic values, some implementations calculate the pairwise similarity between all Census tracts for each dimension separately. To accomplish this, some implementations calculate the Jensen-Shannon Distance (JSD). JSD is a method for measuring the dissimilarity between two probability distributions. It uses a relative entropy approach for two distributions, based on the Kullback-Leibler divergence (KLD) (Equation 2) but varies from KLD in that it is symmetric and the resulting measure is finite. JSD has been used successfully in assessing similarity for a wide range of applications from predicting aesthetic rankings to differentiating how health content is queried. In the geographic domain, JSD has been used for tasks such as differentiating places of interest and assessing land use patterns.

The JSD equation is shown in Equation 1 below where $CT_A$ and $CT_B$ are normalized vectors of the same Census dimension (e.g., race distribution) for two different Census tracts, $$M = \frac{1}{2}(CT_A + CT_B),$$

and x is a single attribute value in the dimension vector X.

$$JSD(CT_A \| CT_B) = sqrt(D(CT_A \| M) + D(CT_B \| M))/2 \quad (1)$$

$$D(CT_A \| M) = \sum_x \left( CT_A(x) \log\left(\frac{CT_A(x)}{M(x)}\right) \right) \quad (2)$$

The results of this analysis are a set of singular values that quantify the similarity between two Census tracts based on the five distributions of ACS data. This process is repeated for all pairs of Census tracts, producing five similarity matrices, one for each of the ACS dimensions. Though JSD values are bounded between 0 (identical) and 1 (complete dissimilarity), the actual range of JSD values depends on the underlying input distributions. These ranges vary considerably between dimensions with some reporting a maximum JSD of 0.5 while others report 0.9. Since the end goal is to determine a single, aggregate value on which to visually represent similarity between regions, some implementations combine the individual dimension JSD values to represent a single Census tract. Some implementations simply average the values. But the difference in JSD ranges means that even an equally-weighted approach would weight certain dimensions more than others. To mitigate this issue, some implementations first normalize JSD values for each Census tract compared to all other geographies. This generates a range of 0-1 for all dimensions in all geographies. Finally, some implementations convert the dissimilarity values to similarities by subtracting each JSD value from one. These five matrices of normalized JSD values are used for updating the data visualization.

Figure 30:
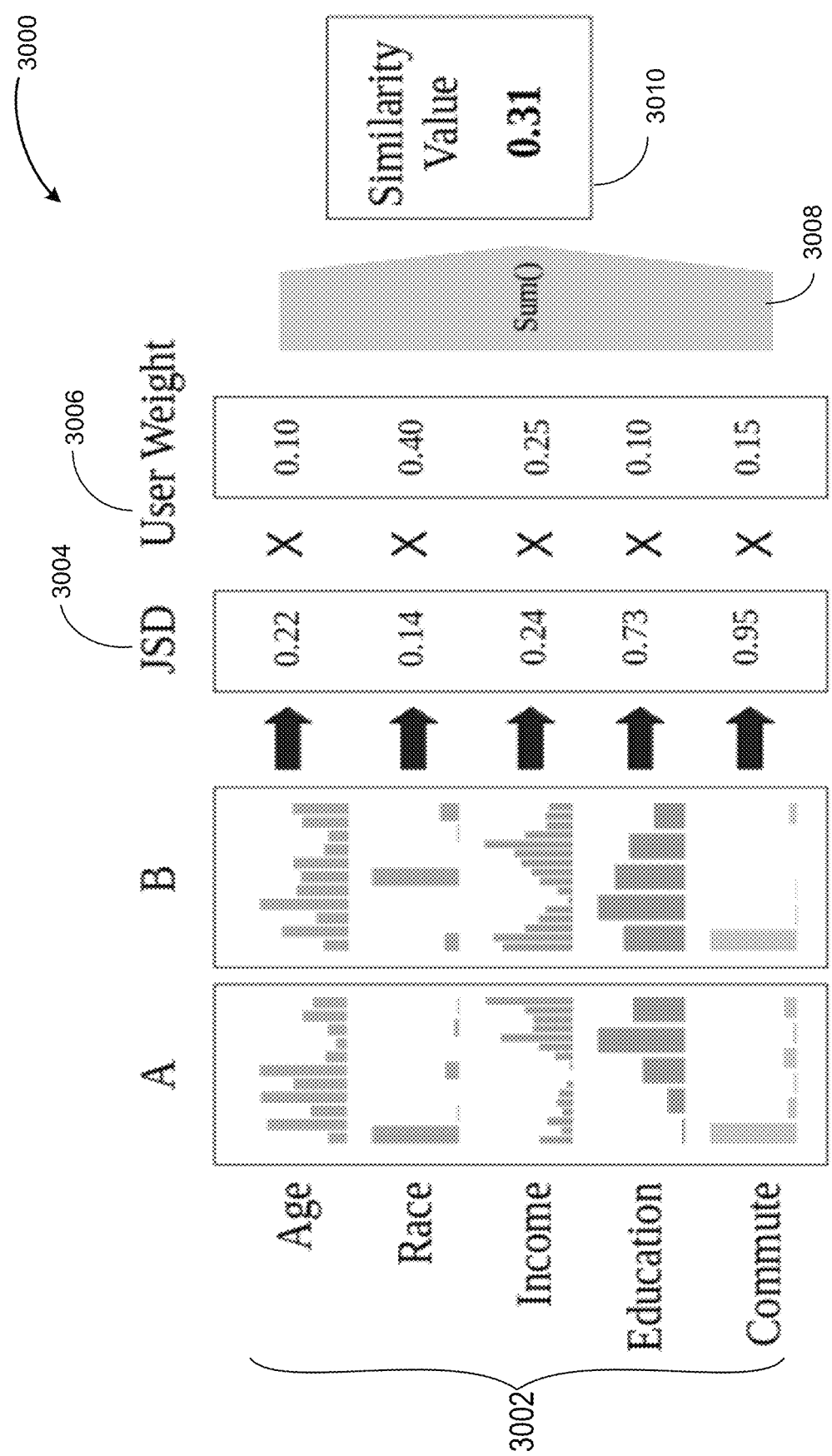
FIG. 30 shows a schematic diagram of an example process for computing a similarity value, according to some implementations.

In some implementations, the next step involves merging the JSD values for each of these independent ACS dimensions into a single similarity value for each pair of Census tracts. This single value is the basis on which similarity is assessed by the user in tabular form and also translated to a color density for visualization. FIG. 30 shows a schematic diagram of an example process 3000 for computing a similarity value, according to some implementations. The process starts with ACS distributions and computes a single similarity value using two sample Census tracts A and B. Some implementations compute similarity between two regions (e.g., Census tracts A and B in FIG. 30). Each Census tract includes a plurality of dimensions of data 3002 (e.g., five dimensions of data, such as age, race, income, education, and mode of commuting). Each dimension of data is a distribution of Census values. Some implementations calculate JSD 3004 between each Census tract dimension individually, then multiply each JSD by a corresponding user weight 3006 (sometimes referred to as user-defined weight), and finally sum (3008) the products to produce a single similarity value 3010 for the pair of Census tracts.

Rather than average the dimension-specific JSD values, some implementations instead allow the user to determine the impact each dimension has on the overall similarity of the tracts. Some implementations provide a series of user-defined weights, as sliders in a graphical user interface. A weight is assigned to each of the dimensions with all weights summing to 1. The exposure of these weights invites a user to adjust the model to best meet their analytical requirements. Users have different preferences, objectives, and exploration goals and the opportunity for an individual or group to govern the similarity assessment process empowers the user, enhancing the usability of the tool.

Example User Interface

Figure 31:
FIG. 31 shows an example user interface, according to some implementations.

FIG. 31 shows an example user interface 3100, according to some implementations. The example user interface includes a map data visualization 3102. The example shows similarity of US Census tracts in comparison to a selected location, labelled (A). Details on similarity are included in a tooltip (B). The user interface allows users to weight specific characteristics of interest (C) to tailor the calculation of similarity according to the user's question and interest, provides multiple map types for visualization (D), as well as features to allow users to save and re-use preset files (E) with specific mixer settings and filters. An interactive text description (F) and a sortable summary table (G) are also provided.

In some implementations, upon launching a data visualization application, a user is presented with a map (e.g., a map showing Census tracts for the state of California) in a uniform color (e.g., in uniform gray). Map labels showing neighborhoods, towns, and cities (depending on zoom level) are overlaid on top of the Census tracts as a reference layer. A vertical panel on the left side of the screen allows a user to select a Census tract by clicking the map. When a Census tract is selected, the identifier of the tract is sent via a web handler to the database to return a JSON response, the pre-calculated five dimension JSD similarity values. Each of the five JSD values for each Census tract is then multiplied by the normalized user-defined weights (evenly weighted on page load) and summed to produce the single similarity value for each Census tract.

Example Map Panel

In some implementations, the similarity values are then translated onto the map using an equal interval choropleth color scheme and applied to the Census tract layer on the map. In some implementations, darker colors or shades (e.g., darker blue values) indicate higher similarity. In some implementations, tooltip functionality allows a user to hover the mouse over each Census tract on the map and receive information containing the Census tract identifier, county name, similarity rank, and percentage of similarity match to the selected Census tract. In some implementations, within a settings menu, a user has the option to enable additional tooltip details, which adds the similarity values for each of the individual dimensions to the tooltip.

Some implementations provide a map panel that allows a user to select a Census tract of interest. Some implementations respond by cartographically and/or tabularly presenting the similarity between a selected region (or regions) and all other regions within the dataset. Some implementations also provide the ability to interact and explore the map through zooming and panning.

Figures 20A, 20B:
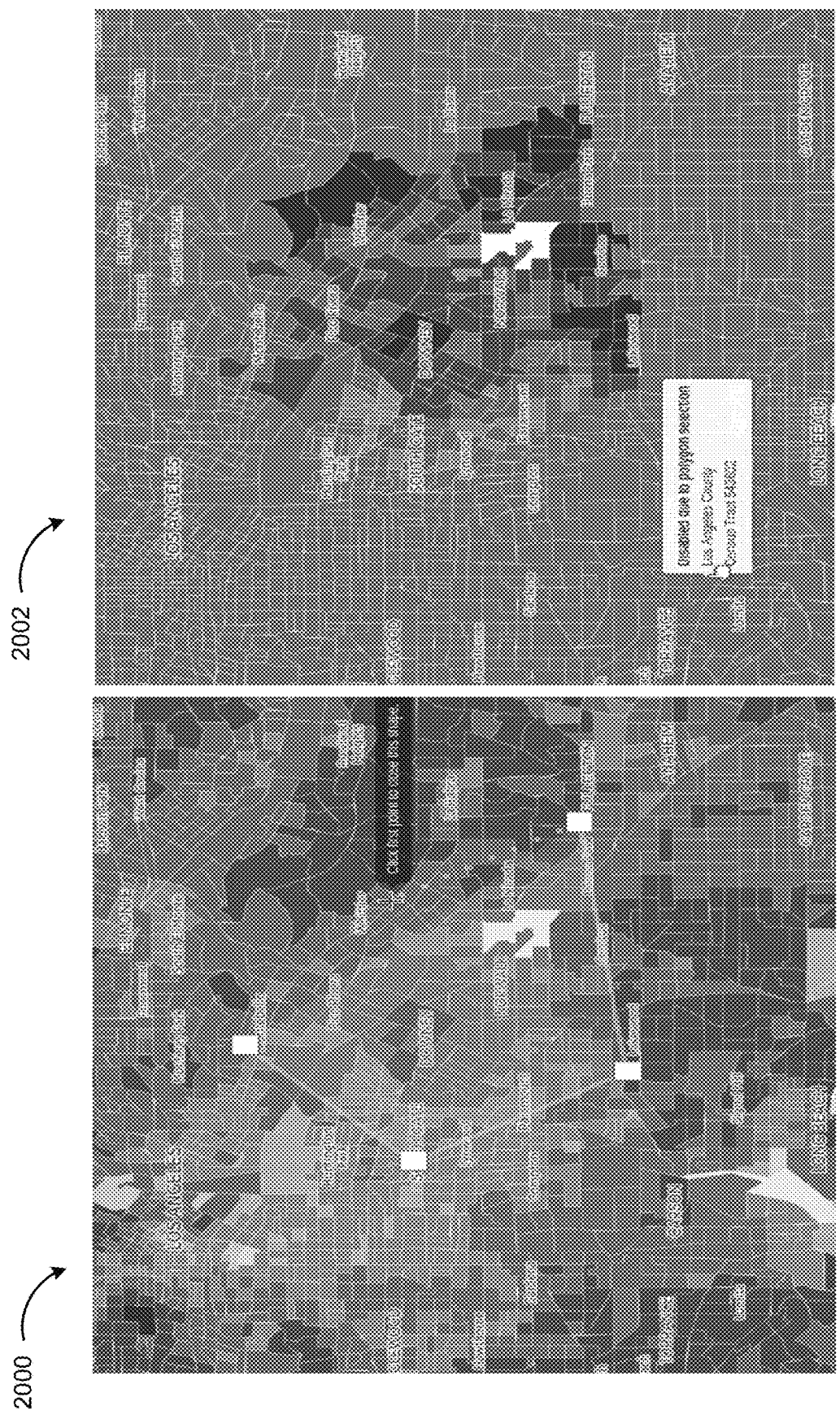

FIG. 20A shows an example user interface 2000, which provides a draw polygon functionality, according to some implementations. In some implementations, a draw polygon tool allows a user to sub-select a set of census tracts for analysis. The user can select the draw polygon tool, which enables manually drawing a region on the map in order to limit the similarity assessment to a specified subset of interest, as shown in FIG. 20B. In some implementations, from the map panel, users can also print the map, change the base map from standard map tiles to satellite imagery, and toggle map labels, county boundary layer, and the main Census tract layer.

Example Tabular Panel

In some implementations, as the map updates to depict regional similarity, another panel is presented below the map. The additional panel provides descriptive content related to the similarity analysis. In some implementations, the descriptive text in this panel presents the number of highly similar Census tracts, the number of counties in which they are found, and/or the number of similar Census tracts in the same county as the selection. The text is embedded with hyperlinks allowing a user to zoom to the top counties or county of the selected Census tract. In addition, a table listing the top five most similar Census tracts, their percentage of similarity match, county name, and distance and direction from the selected Census tracts is shown. In some implementations, users can click on a row in the table to highlight the tracts on the map or zoom to the selected tract by selecting the magnifying glass icon. Within this table, clicking the column header for similarity toggles between descending and ascending orders, allowing a user to easily identify the top most, and least, similar tracts.

Example Side Panel

In some implementations, once a Census tract is selected, a side panel also emerges, offering a range of interactive tools to enable data exploration and analysis. In some implementations, the side panel includes a series of widgets including a mixer, map types, presets, location bookmarks, and/or geographic filters.

Example Mixer Widget

In some implementations, a mixer provides interactive functionality through which a user can adjust the importance (weight) of a socio-economic or demographic dimension in the overall contribution to the similarity value. These weights are represented by sliders that allow users to increase the weight by moving a slider to the right and decreasing the weight by moving to the slider to the left. In some implementations, by default, the mixers are evenly weighted at an importance value of 50. As a user adjusts a mixer, the color density of the dimension label changes, the numerical representation of the weight changes (bounded between 0 and 100), and the tooltip associated with the mixer updates to inform the user the impact that the adjustment is having on the overall similarity model.

In some implementations, at least some of the mixers in the widget are not socio-economic or demographic dimensions. For example, the first five mixers in this widget may be socio-economic and demographic dimensions of the Census data, but a last mixer (e.g., a proximity mixer) is not. This proximity mixer adjusts the weight of the Euclidean distance between two Census tracts in the mix. By increasing the weight of proximity in the mix, those Census tracts physically closer to the selected Census tract are deemed more similar than those further away. Adjusting the value of the proximity mixer to 0, removes the influence of geographic proximity all together.

Once a user has identified a combination of weights that is useful for analysis, the user has the option to save the mix to a new preset. This updates the preset widget, generates a preset XML file for download, and presents a unique uniform resource locator (URL) to share with collaborators.

Example Map Type Widget

Figure 32A:
FIGS. 32A and 32B show different cartographic visualizations for similarity data, according to some implementations.
Figure 32B:

FIGS. 32A and 32B show different cartographic visualizations 3200 and 3202, respectively, for the same underlying similarity data, according to some implementations. By default, some implementations present Census tract similarity using a gradient-based choropleth map (FIG. 32A). This representation is useful in many circumstances, but may not be the most appropriate cartographic visualization in others. For this reason, some implementations provide an alternative map type option, such as Most/Least (FIG. 32B). This option simplifies the map, presenting the similarity of each region as one of three options: highly similar in a first color (e.g., blue), highly dissimilar in a second color (e.g., red), or somewhere between in a third color (e.g., gray). In some implementations, users can further refine what "highly" means by selecting the top similar/dissimilar as 1000, 100, or 10 Census tracts to the selected tract. This cartographic approach is particularly useful for those users that prefer a Boolean-type (similar or dissimilar) visualization instead of a gradient.

Example Preset Widget

In some implementations, when a user has created a mix by adjusting the sliders in the mixer widget, the user can choose to label and save the mix as a preset and it appears as a button in this widget. Multiple presets can be created to represent various scenarios and enable different types of analysis. These presets are also saved to a preset XML file and stored on the server with a unique identifier that can also be appended to an URL in order to share presets with collaborators. If the users have created or shared a preset through a preset XML file in a previous session, they can also upload this file through the settings menu, automatically adding buttons to the widget that adjust the mixers.

Example Location Bookmarks Widget

In some implementations, a location bookmark widget stores locations of interest as buttons. Clicking a button zooms the map to a specified region. In some implementations, three location bookmarks are added to the tool by default, but additional bookmarks can be added by uploading a preset XML file containing labels, geographic coordinates, and zoom levels.

Example Geographic Filters Widget

Figure 33:
FIG. 33 shows an example user interface, according to some implementations.

FIG. 33 shows an example user interface 3300, according to some implementations. In some implementations, a geographic filter widget allows users to filter the existing Census tracts through additional attributes. For instance, a user can decide to explore only Census tracts whose population density is less than 100 people per square mile (as shown in FIG. 33), or only those Census tracts less than 20 kilometers from the coast. By default, some implementations include a sample set of additional variables such as those mentioned. In some implementations, users can write their own SQL-type queries against these data, add them to the preset XML file, and upload them to the tool. When the file loads, only those Census tracts that meet the criteria specified in the query, are displayed on the map. This is a powerful feature, allowing users to limit the data through external attribute filtering before digging into regional exploration and similarity analysis.

As described above, some implementations group socio-economic and demographic variables into dimensions of similar characteristics, calculate similarity metrics, and/or allow users to weight these dimensions to customize how similarity is calculated. This allows users a lot of flexibility in defining similarity. Some implementations allow users to use one dimension, which is useful when the users just want to know similarity based on the one dimension (e.g., age distribution). Some implementations allow users to use a combination of dimensions, which can be useful to know about multiple dimensions (e.g., age and income), while allowing the users to weight dimensions differently (e.g., if the users wanted income to be more important in calculating the similarity, they can adjust the weights accordingly).

Some implementations use Jensen-Shannen Divergence (JSD), which is a statistical method of measuring (dis) similarity between two probability distributions. JSD itself is based on Kullback-Leibler Divergence, a method often used for measuring information gain in statistical models of inference. JSD is more appropriate for applications that are symmetric. This is particularly important when the application is symmetric because it is conceptually easier to understand similarity when the value comparing any two census tracts is the same in both directions: similarity of Tract A→Tract B is equal to Tract B→Tract A. Given that the variables in the distributions are all normalized across all of the attributes so that values for each tract sums to 1, the JSD similarity value will always be bounded between 0 (identical distributions) and 1 (complete dissimilarity).

Figure 1C:
FIGS. 1C, 1E, 1F and 1G show examples of graphical user interface displaying maps, according to some implementations.
Figure 1D:
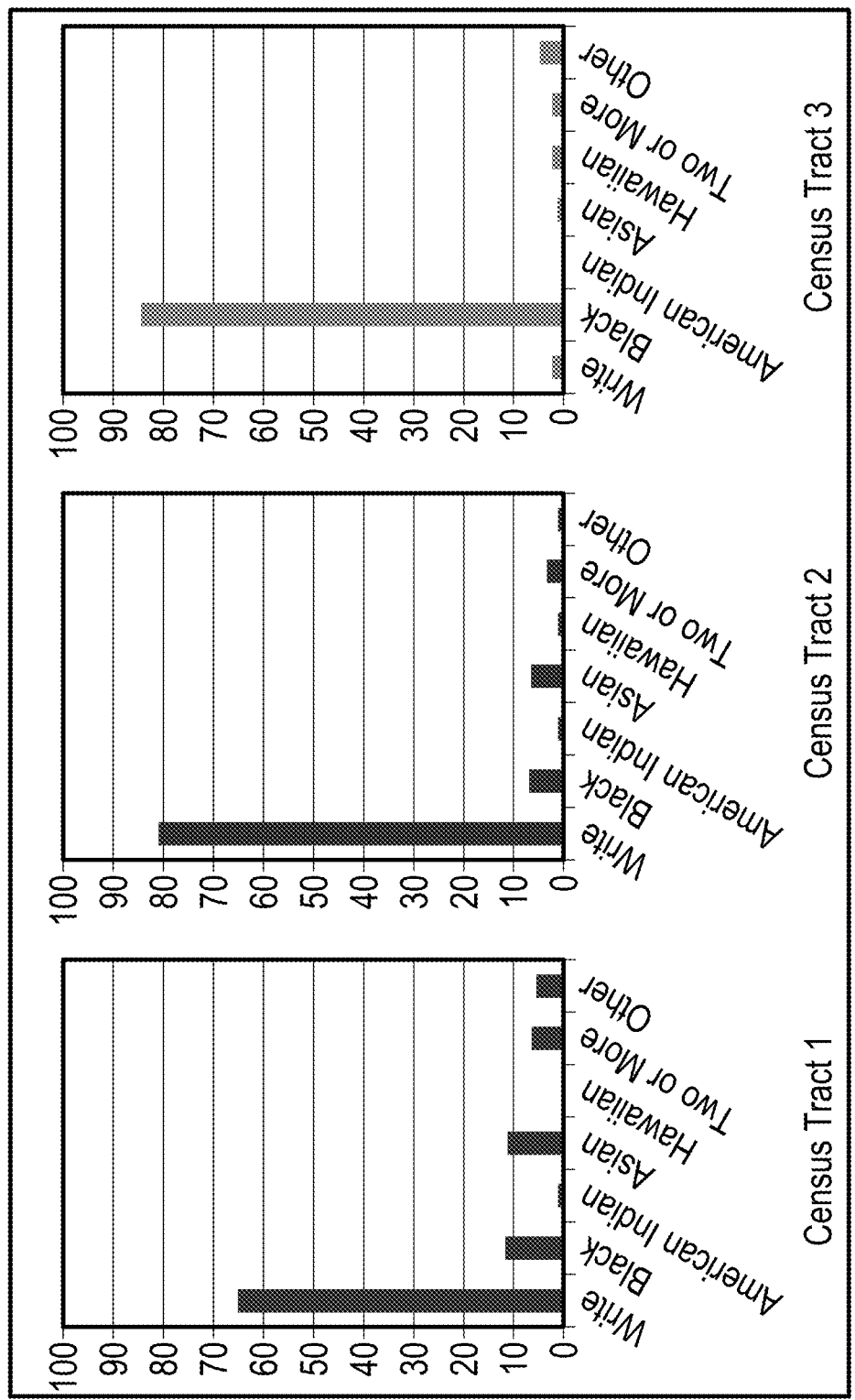
FIG. 1D shows example charts, according to some implementations.

To illustrate, consider the example shown in FIG. 1C. The image 104 in FIG. 1C shows Census tracts in the region of Los Angeles. Three Census tracts are selected in this example. The distribution of race variables is shown in charts 106 shown in FIG. 1D, according to some implementations. Visually, and as one might expect given spatial proximity, Tract 1 and Tract 2 are more similar than Tract 1 and Tract 3 (the distributions in the chart look more alike). A JSD approach results in a similarity value between Tracts 1 and 2 of 0.1359, indicating they are more similar, whereas the similarity value between Tracts 1 and 3 is 0.7197, indicating that they are less similar. JSD is a dissimilarity measure, so a measure of 0 is identical, and 1 is completely dissimilar.

Figure 1E:
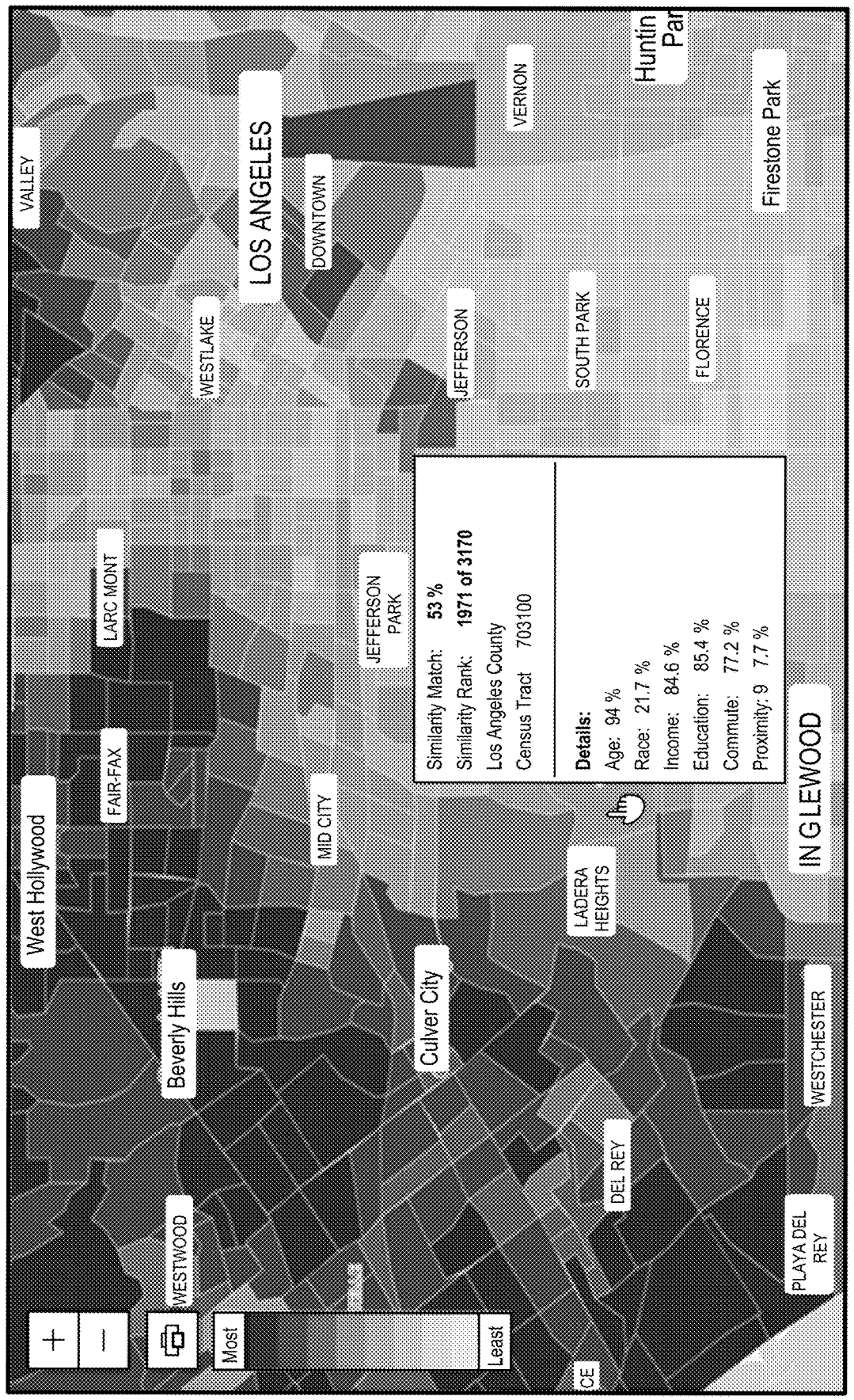

Using this approach, some implementations then calculate the JSD for any characteristic between all possible pairs of locations, such as shown below with census tracts. Some implementations use a distinctive color or brightness level to highlight the tract selected by the user (e.g., a brighter color). For example, a brighter tract in the map 108 shown in FIG. 1E is the selected tract, and each other tract shows the relative similarity to this selected location, according to some implementations.

Some implementations show the JSD across multiple categories of attributes and allow users to weight their importance in assessing similarity. In the map 108, a tooltip shows similarity measures for the dimensions Race, Age, Income, Educational Attainment, and Mode of Commute. Some implementations show the similarity values individually in a tooltip. Some implementations allow users to combine the similarity measures to tailor the importance of different attributes to their specific question of interest. This introduces a new challenge since there are multiple dimensions on which to assess similarity. Some implementations handle this by using a set of user-defined weights. Depending on the task, expertise, and topic of interest, different users may want to weight dimensions differently within a similarity model. To do this, some implementations calculate similarity as follows (with the caveat that all weights (w) sum to 1):

$$\text{Sim} = \text{JSD}_{Race}*w_1 + \text{JSD}_{Age}*w_2 + \text{JSD}_{Income}*w_3 + \text{JSD}_{Education}*w_4 + \text{JSD} \ldots *w_N$$

Figure 1F:
Figure 1G:
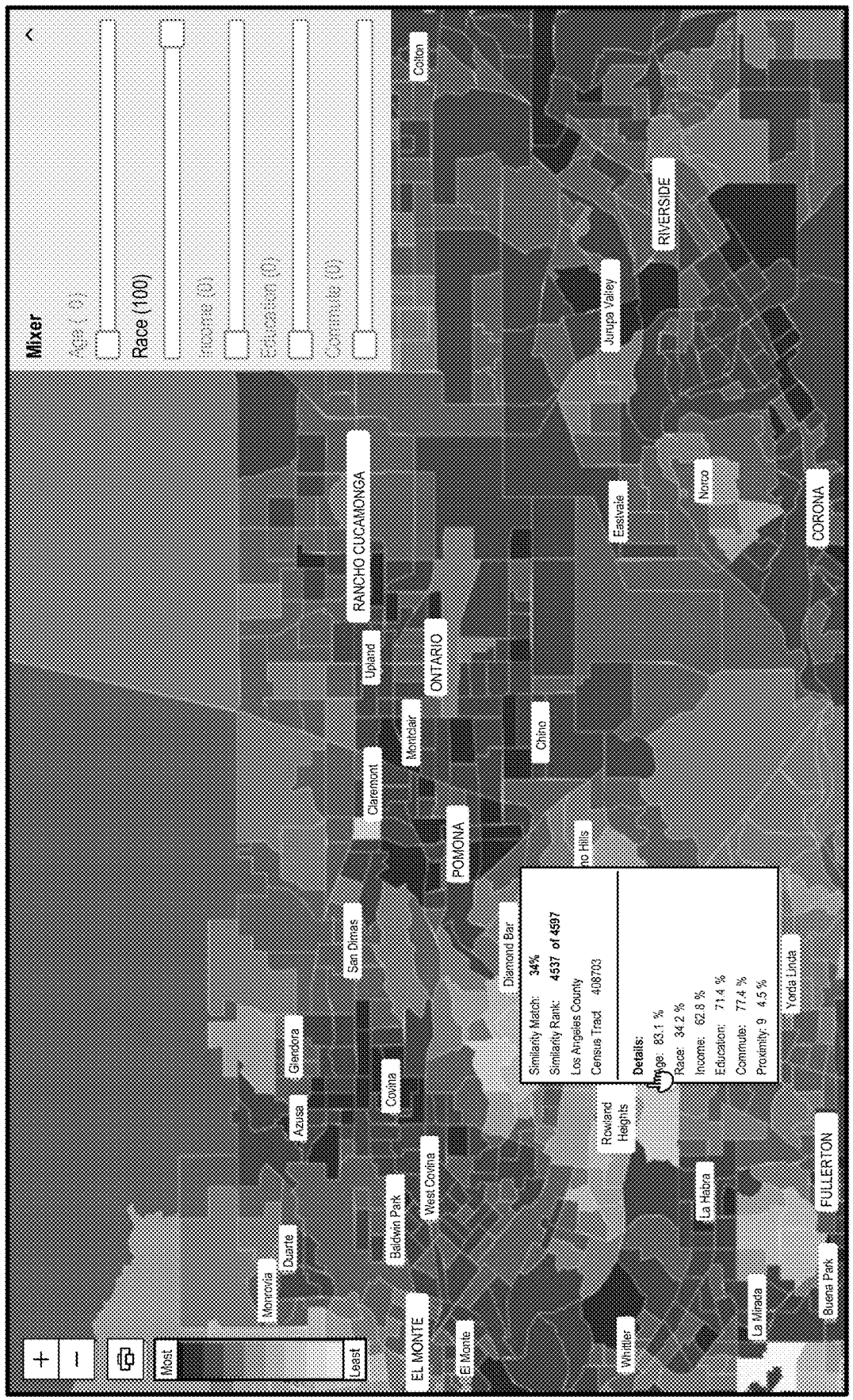
Figure 2:
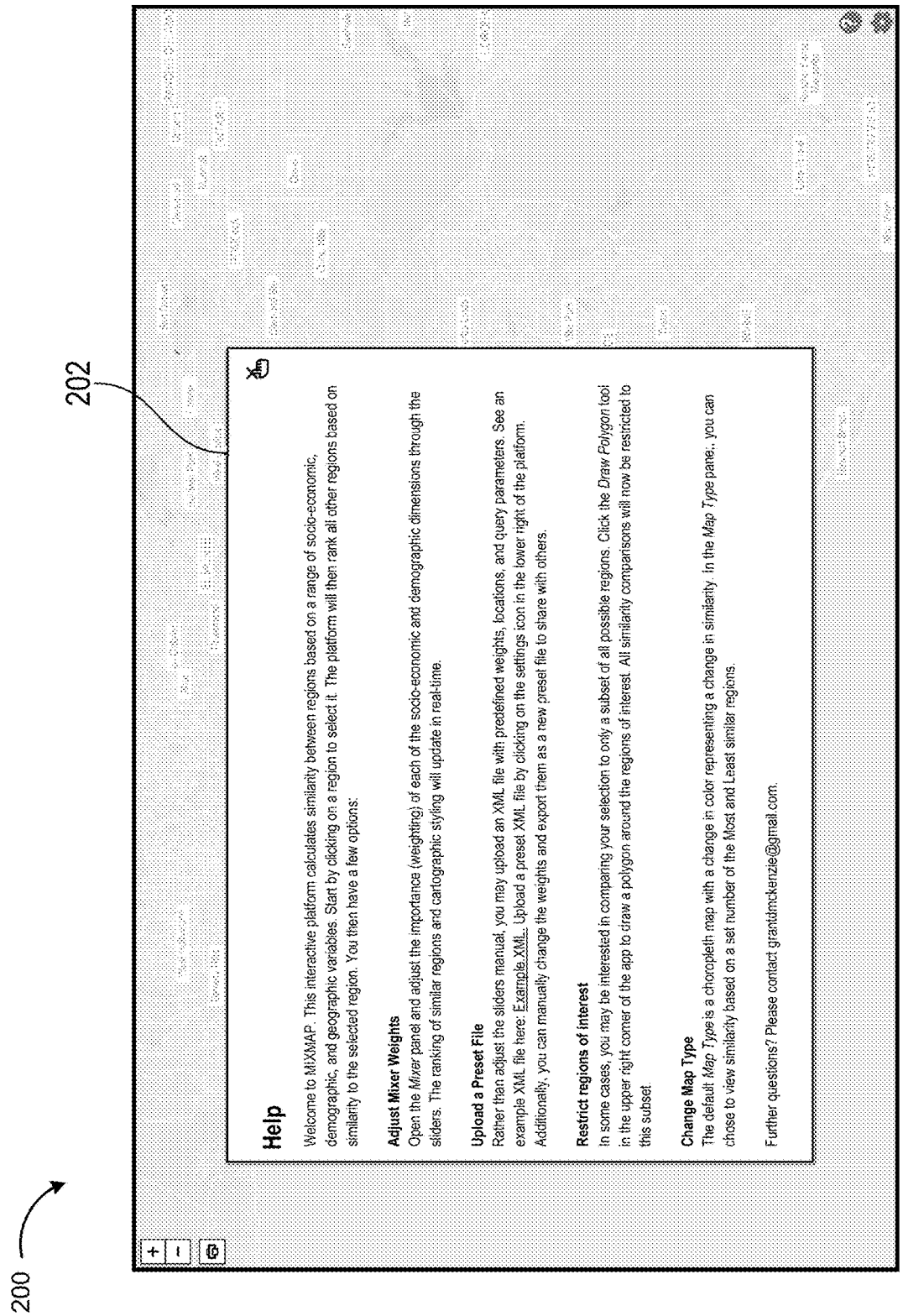

For instance, FIGS. 1F and 1G show two different maps 110 and 112, respectively, showing similarity using different weights on the dimensions, according to some implementations. The map 110 is examining Race, Income, and Education equally weighted. The map 112 shows Race as the only dimension used in the similarity calculation.

FIG. 2 shows a graphical user interface 200 with a help menu 202, which shows various ways users can adjust mixer weights, upload a preset file, restrict regions of interest, and/or change map type, according to some implementations.

Figure 3A:
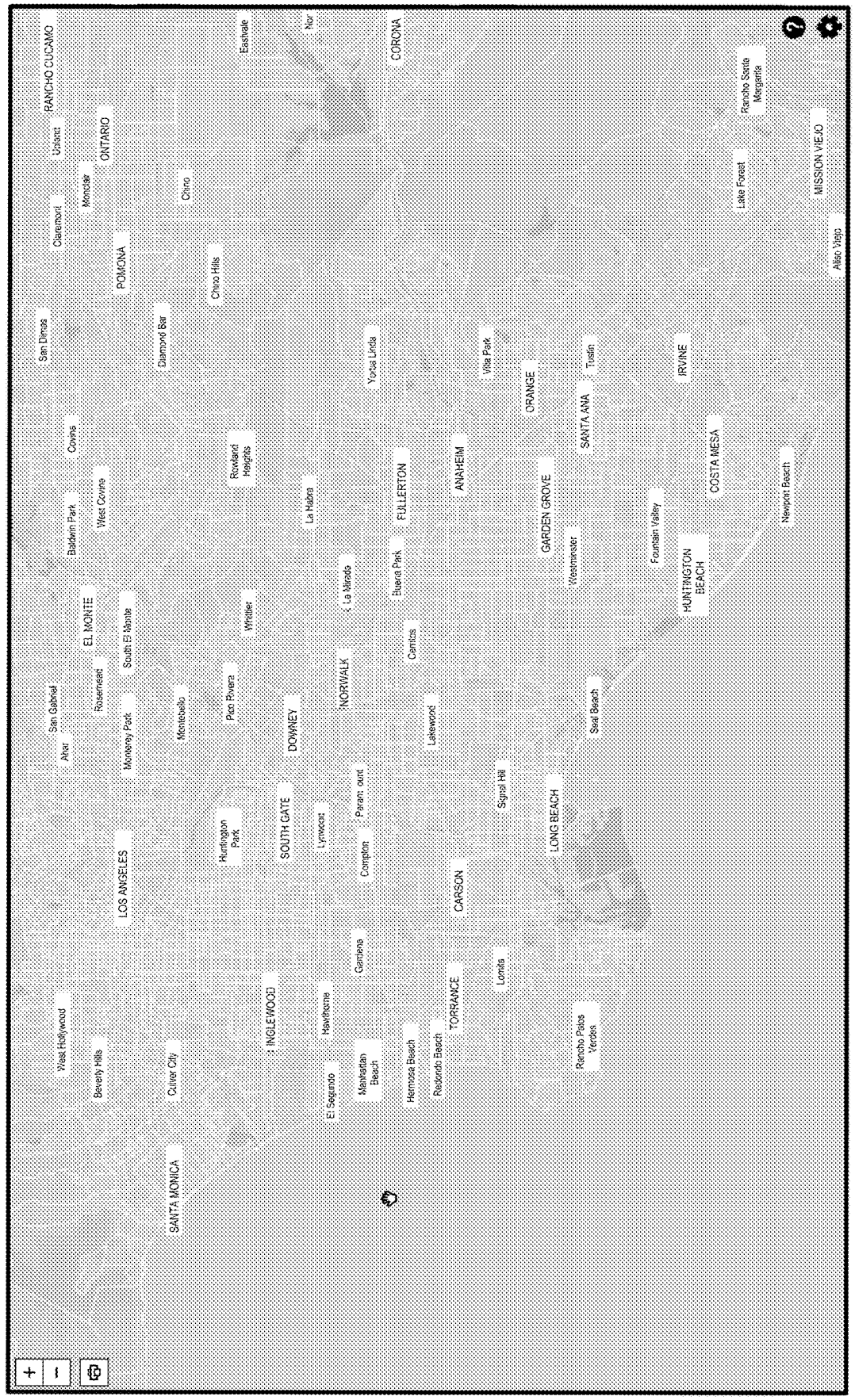
Figure 3B:
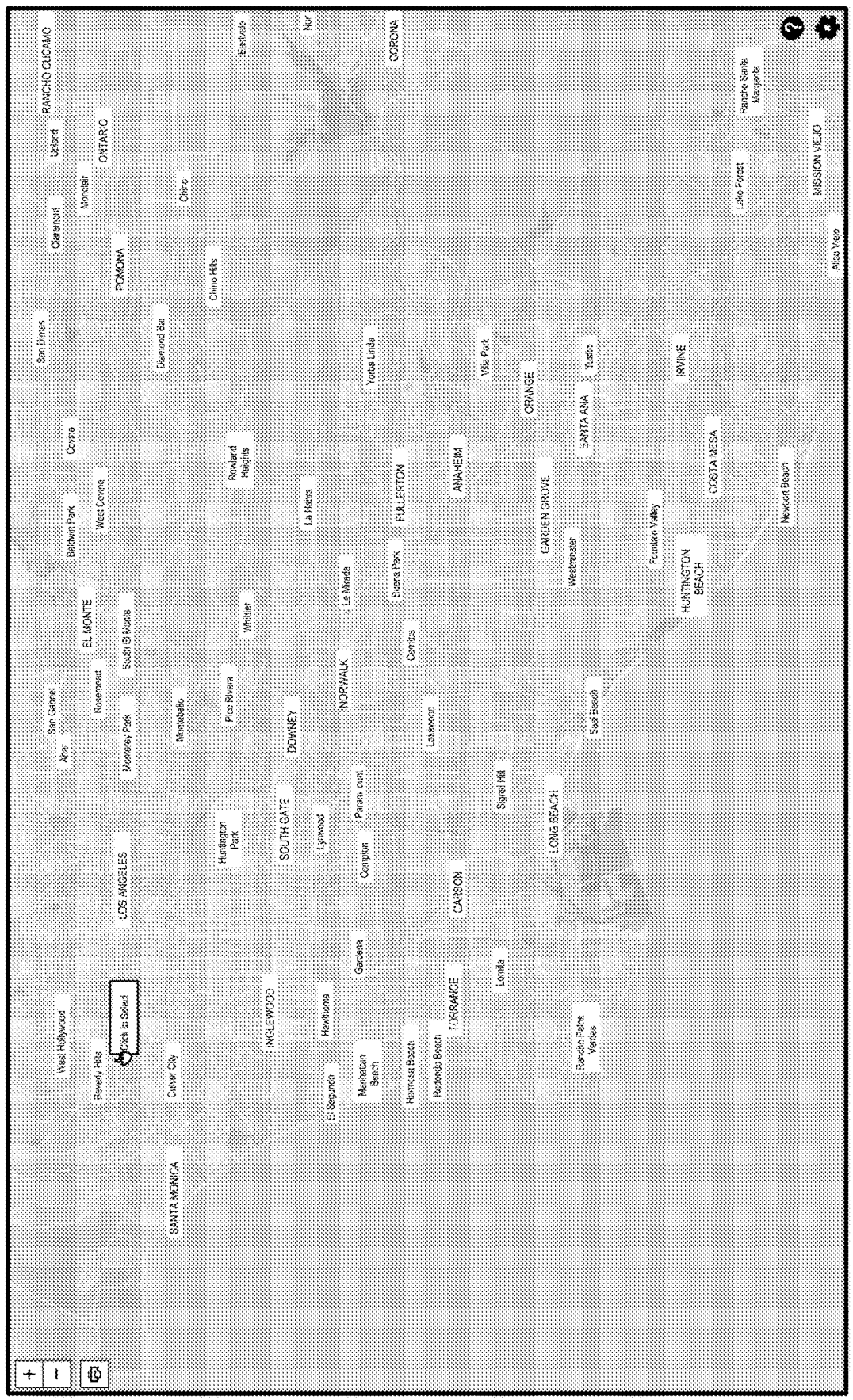

As shown in FIGS. 3A and 3B, some implementations show a map in a graphical user interface (e.g., the interfaces 300 and 302) and allow users to select location and/or regions on the map (e.g., for selecting a specific census tract). In the description herein, data visualizations for a census tract (sometimes referred to as Census tract) are used for illustration purposes. It should be understood that these concepts can be applied for any type of statistical data, geographic information, and/or demographic information.

Figure 4:
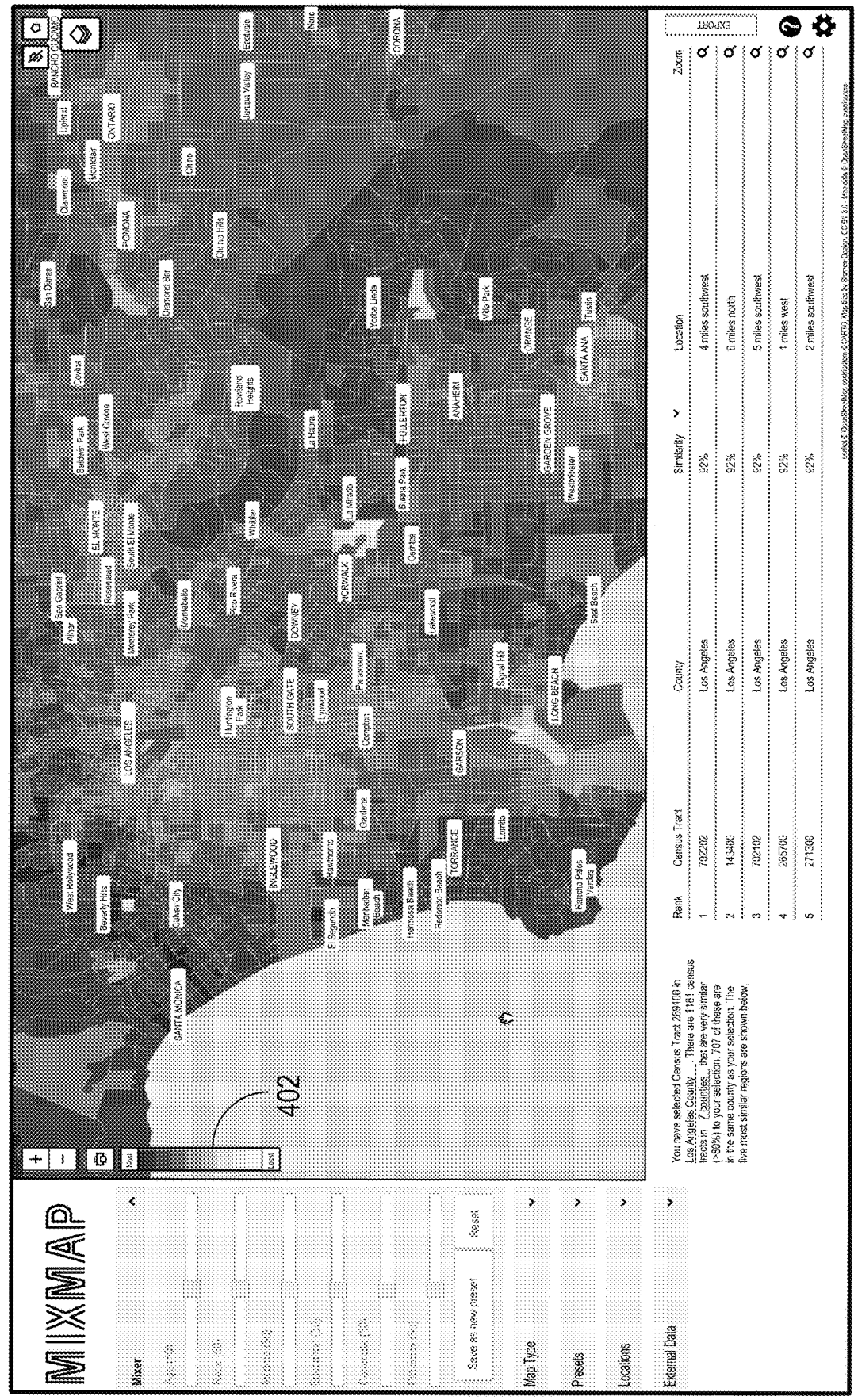

In some implementations, the user interface is automatically updated to show all other census tracts similar to the selected census tract, an example of which is shown in the graphical user interface 400 in FIG. 4. Some implementations display a legend 402 showing least to most similar tracts to the tract selected by the user. Similarity may be measured based on various demographic and economic dimensions.

Figure 5:
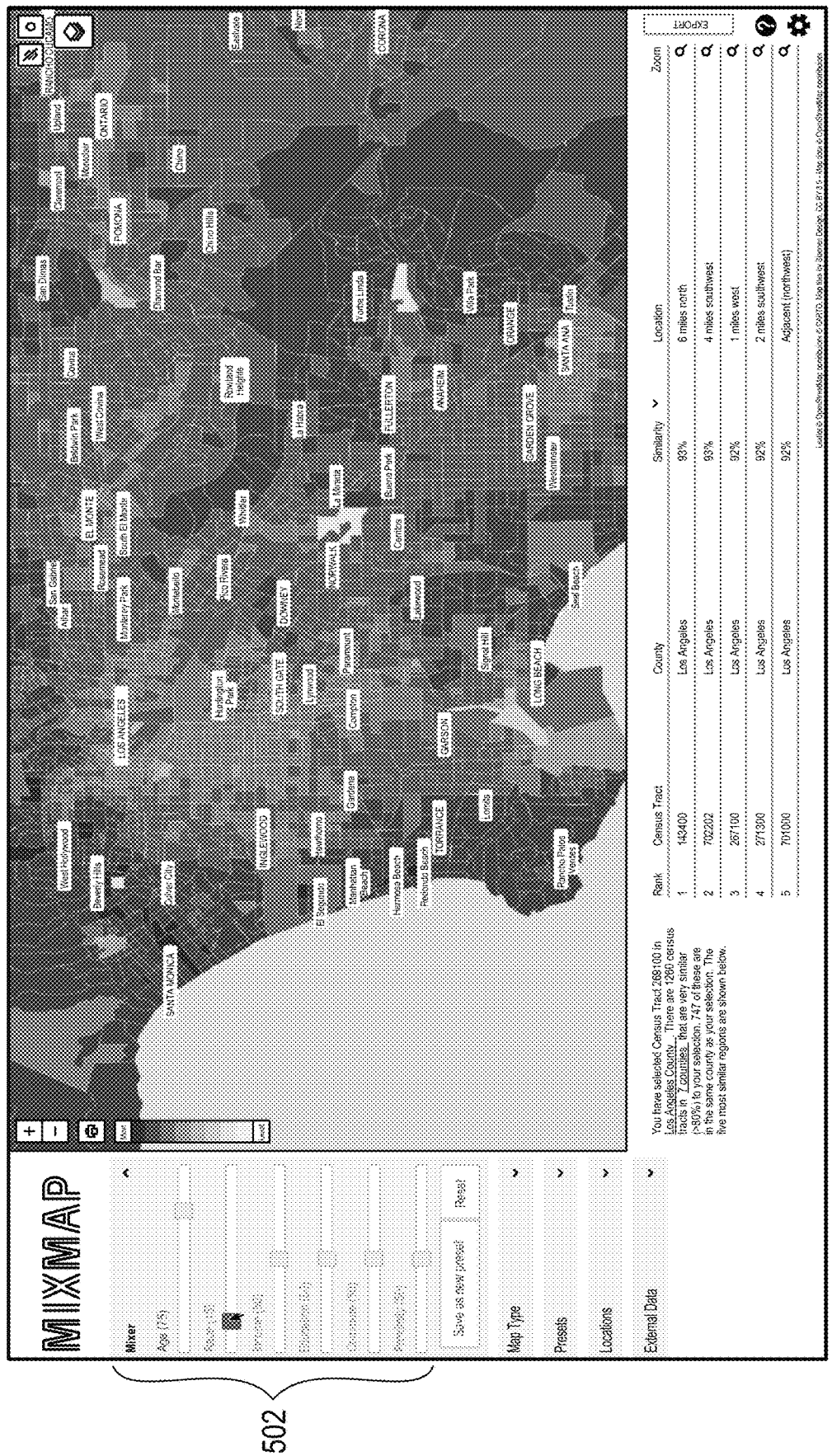
Figure 6C:
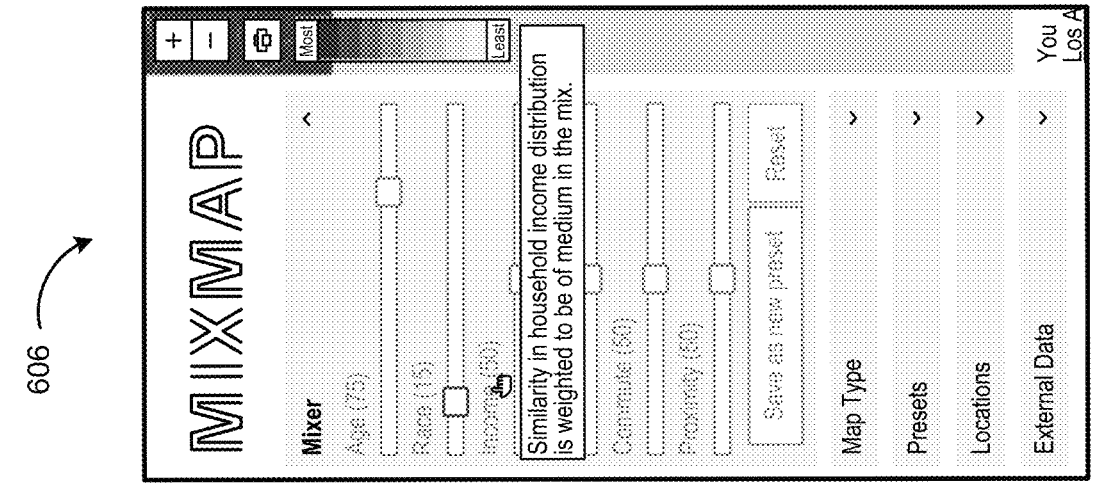
Figure 6B:
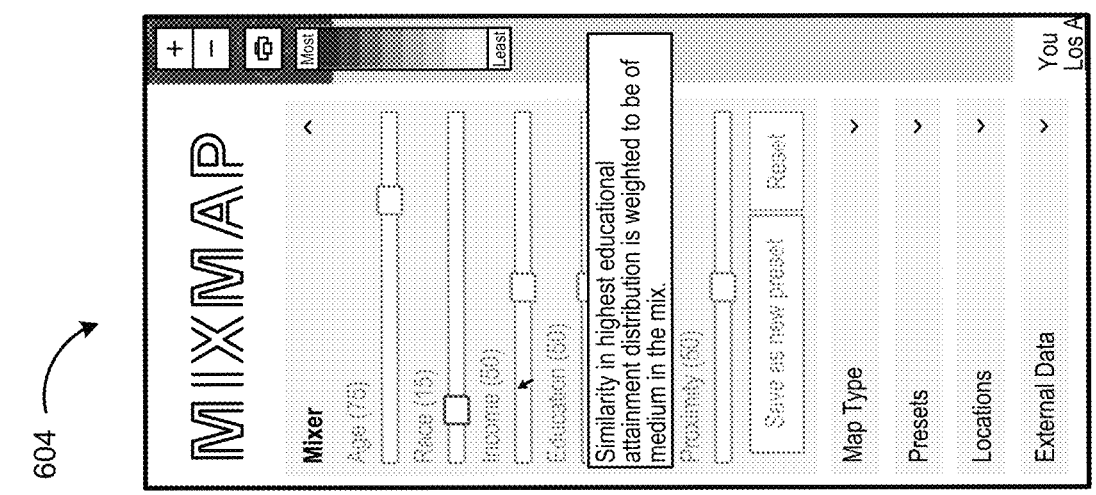
Figure 6A:
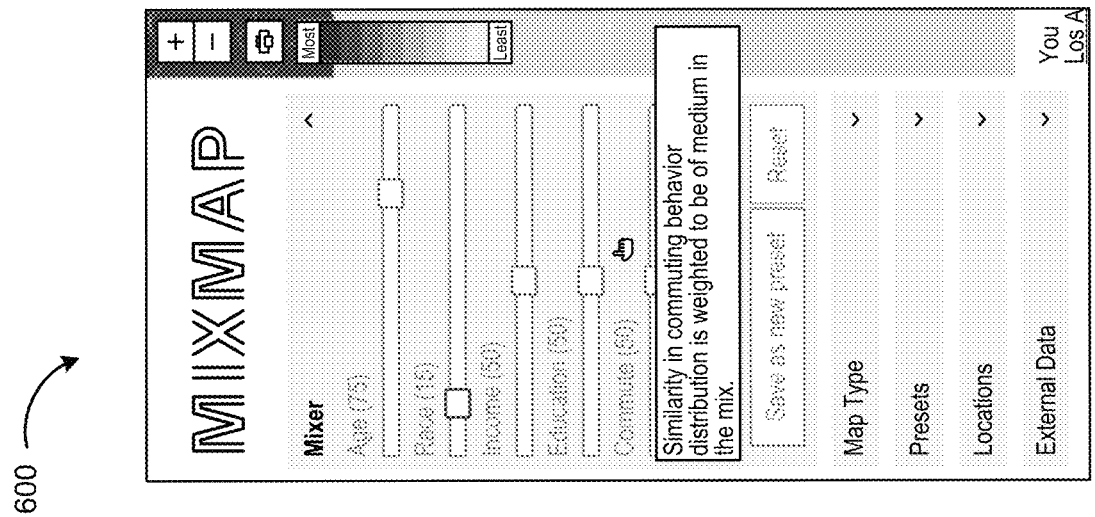
Figure 7B:
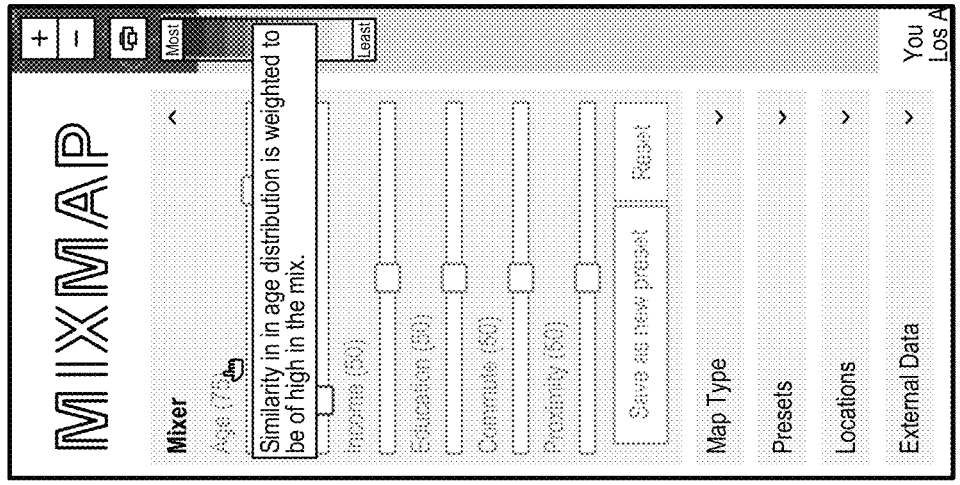
Figure 7A:
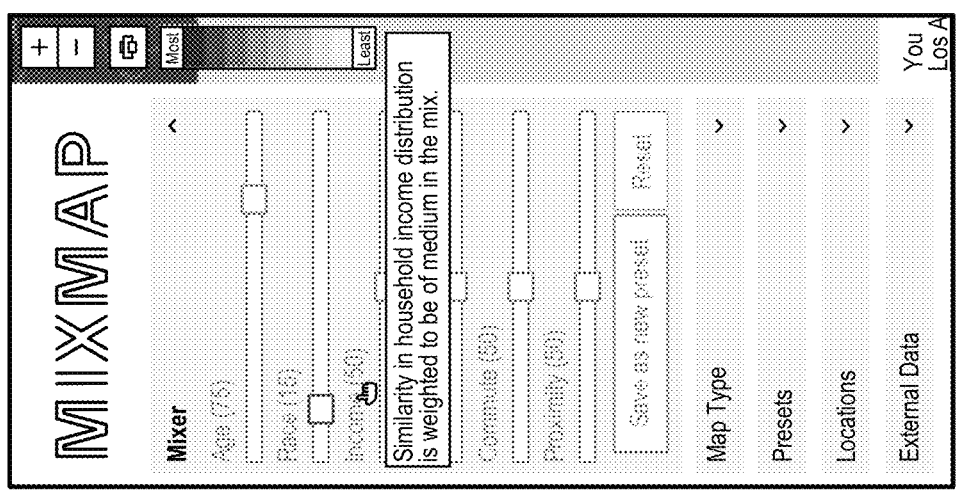

Some implementations show these dimensions in a portion of the graphical user interface with corresponding slider affordances. An example graphical user interface 500 is shown in FIG. 5 with a portion 502 that includes such affordances, according to some implementations. Some embodiments allow users to hover over each affordance to get more information on each category. Each slider affordance can be individually adjusted, according to some implementations. Some implementations display accompanying text that shows details of similarity, including how many tracts are similar to the selected tract, examples of which are shown in portions of the graphical user interfaces 600, 602, and 604 in FIGS. 6A-6C, and in portions of graphical user interfaces 700 and 702 in FIGS. 7A and 7B.

Figure 8:
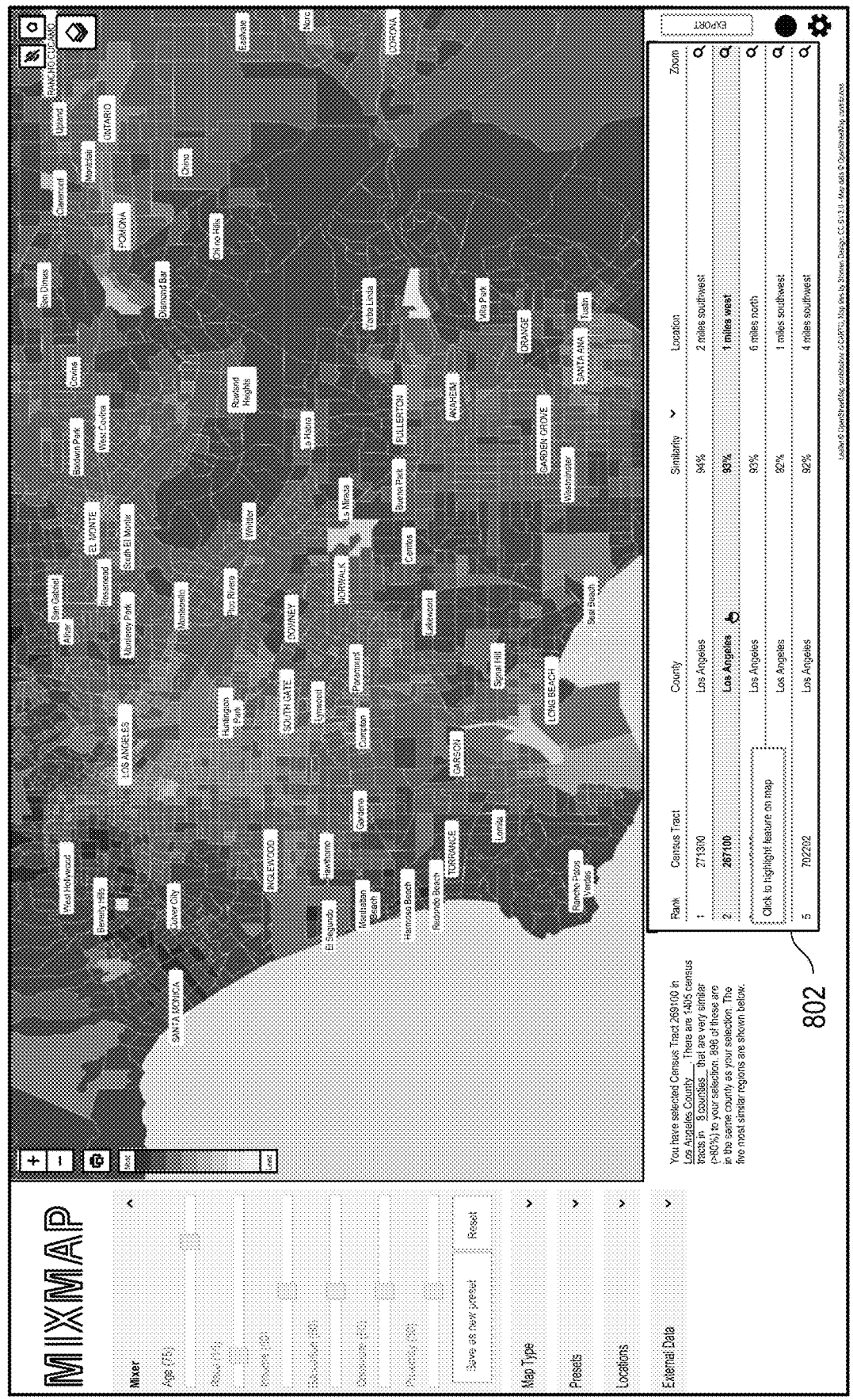
Figure 9:
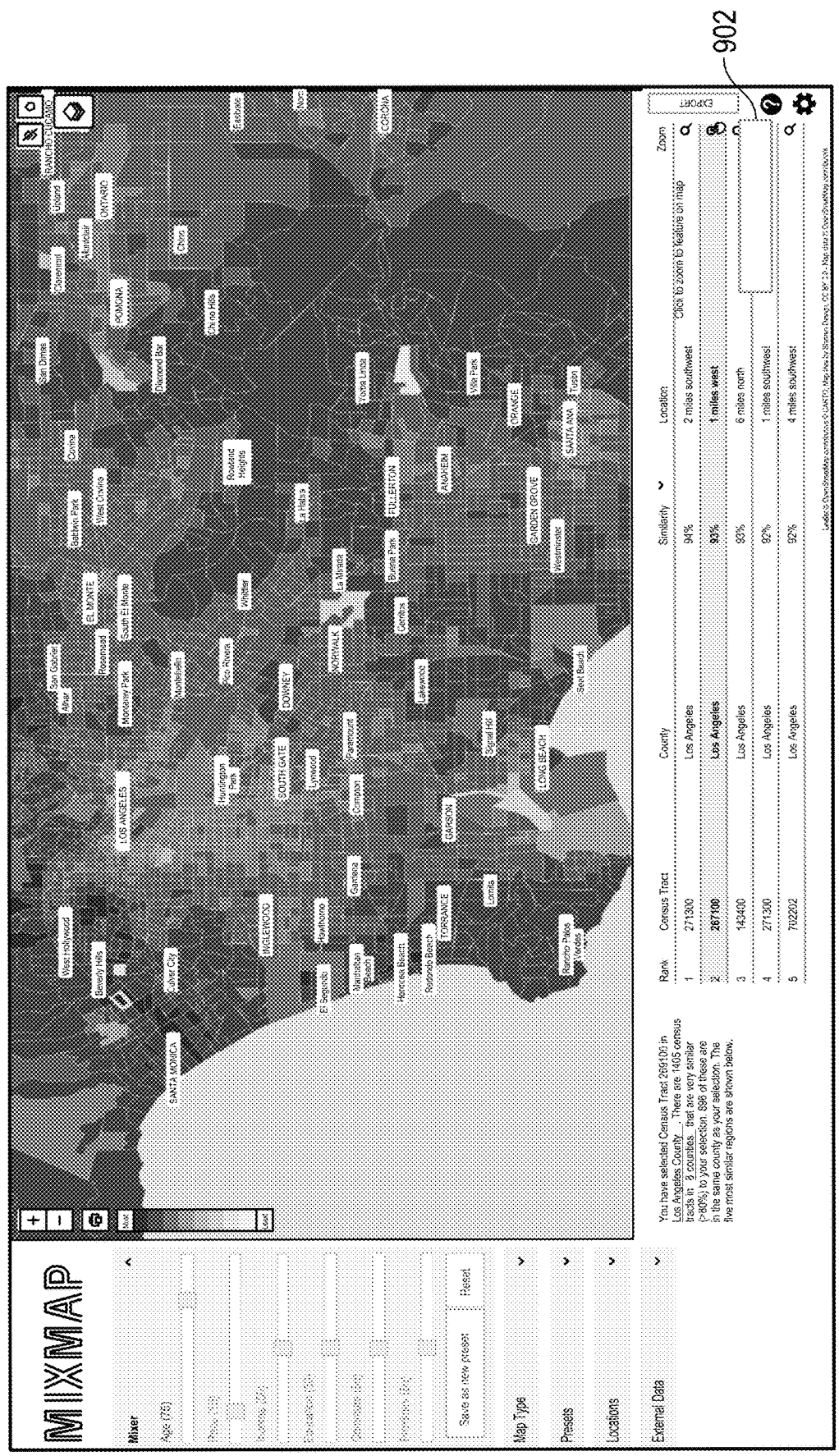
Figure 10:
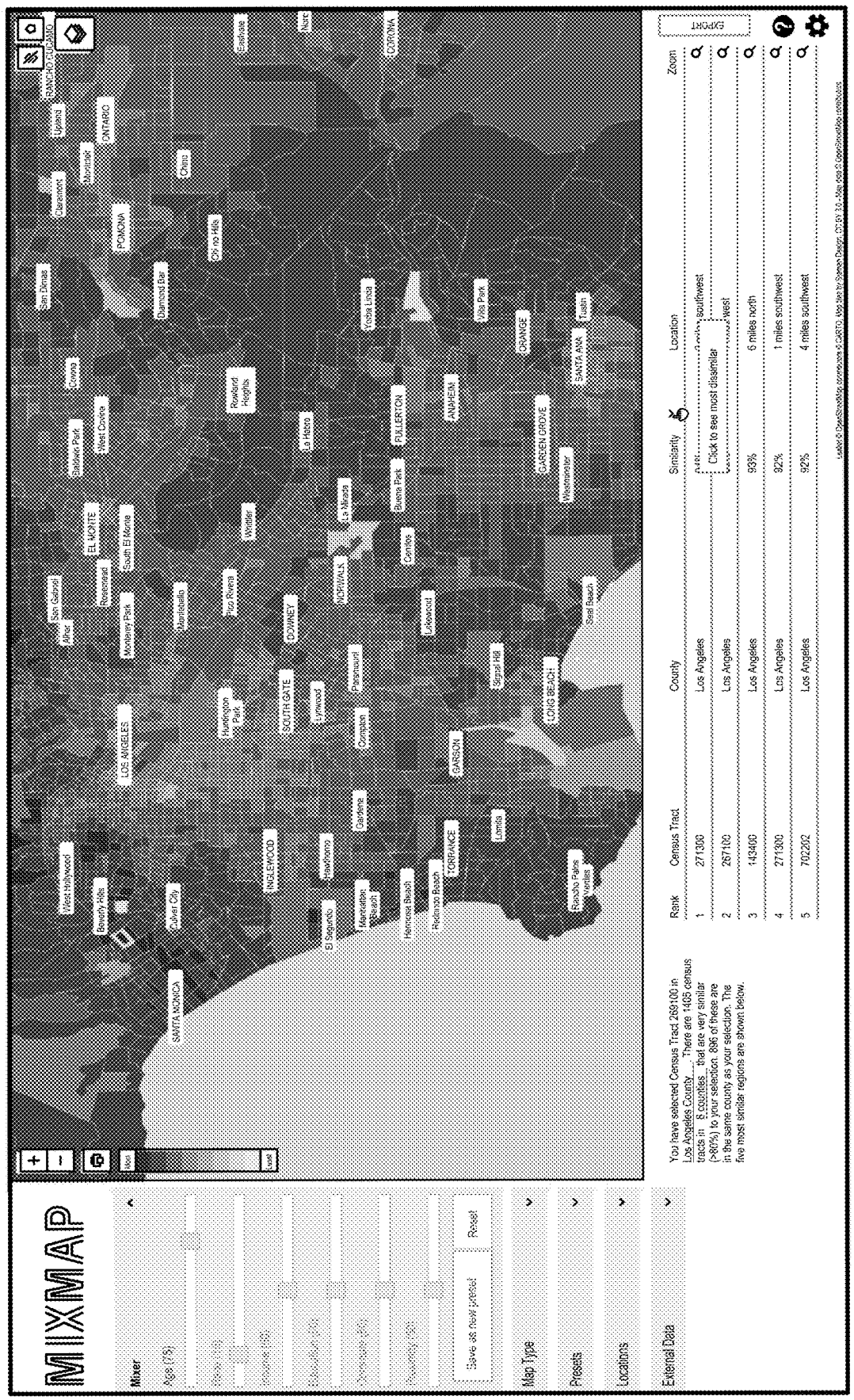
Figure 11:
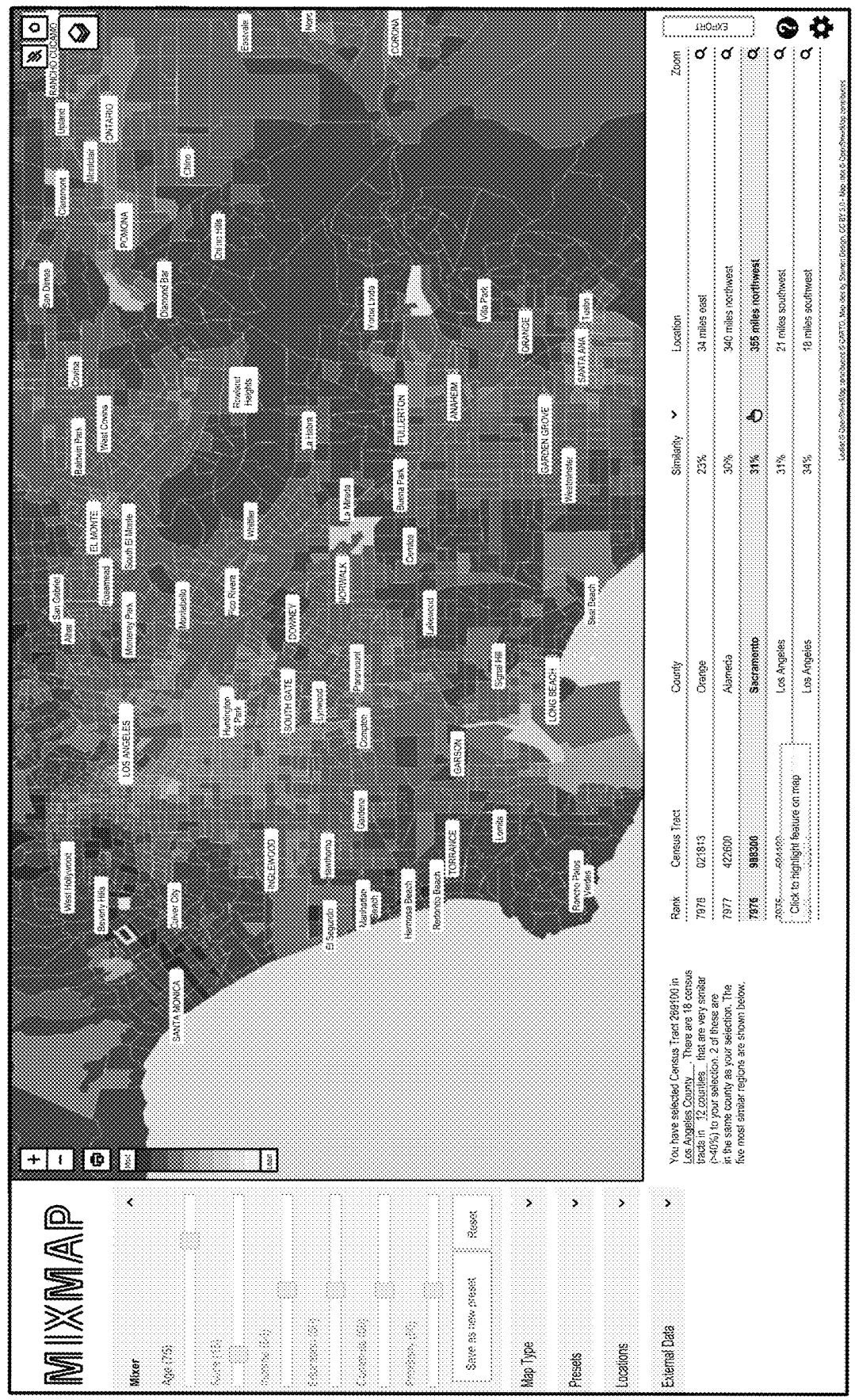
Figure 12:
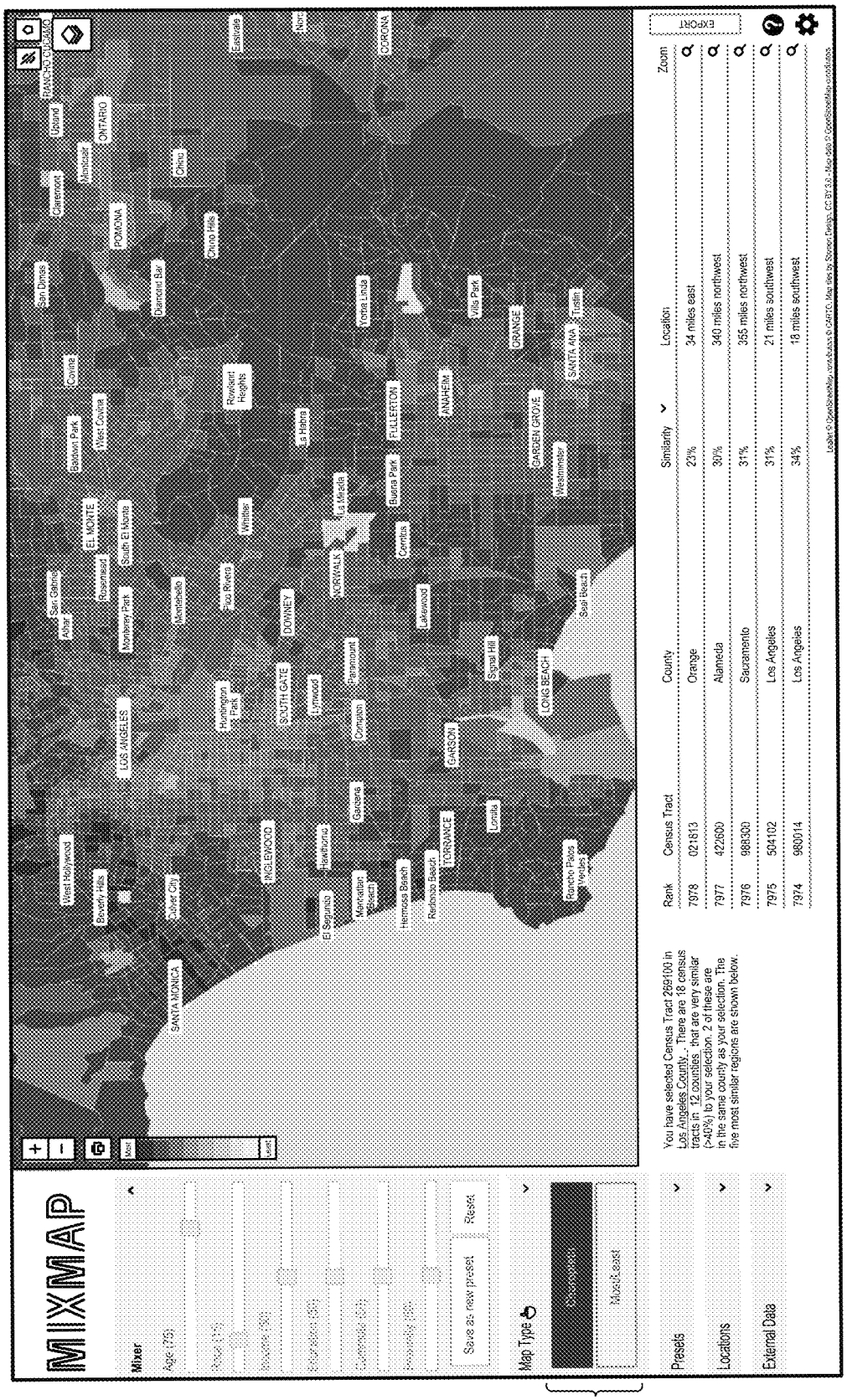
Figure 13:
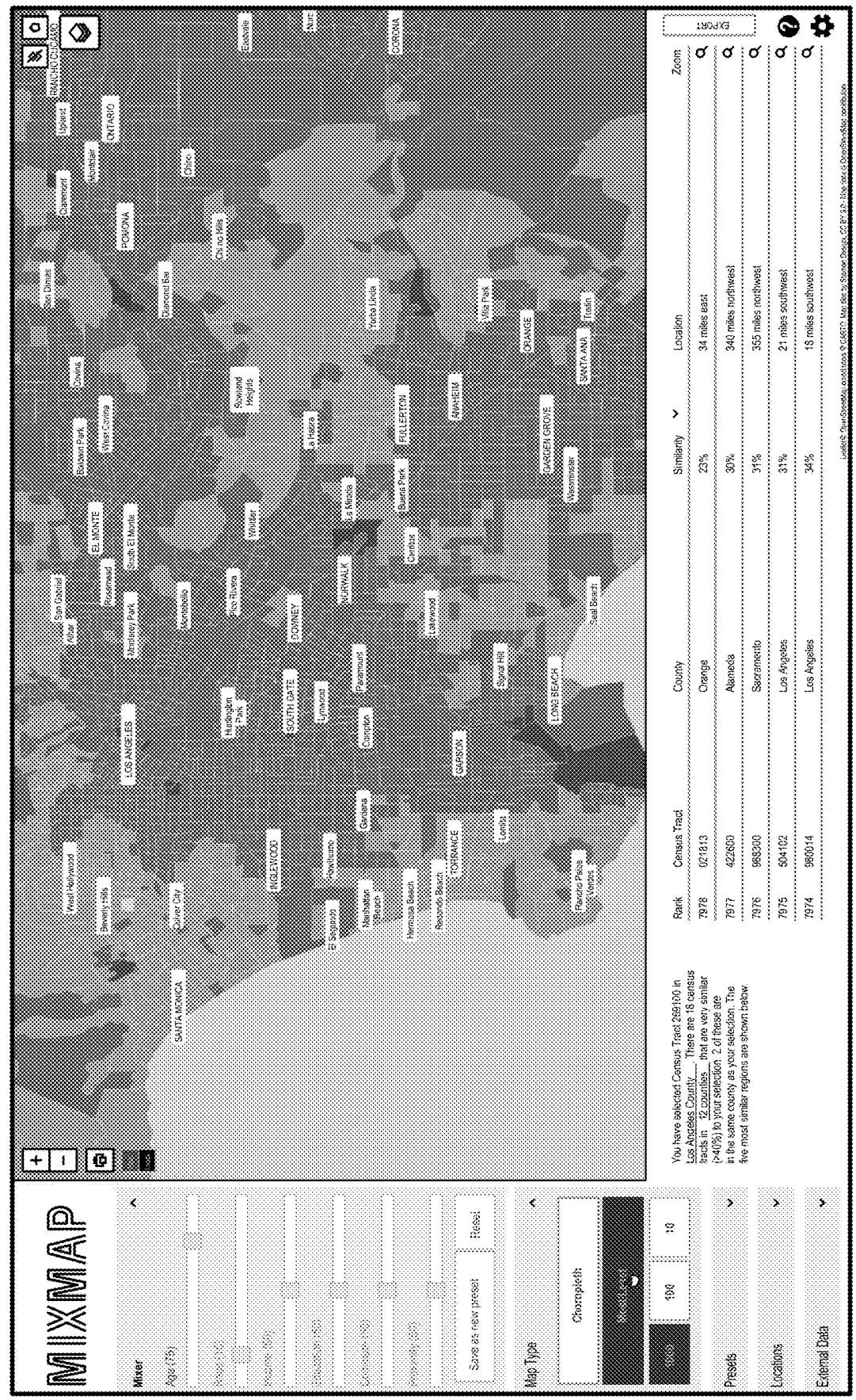
Figure 14:
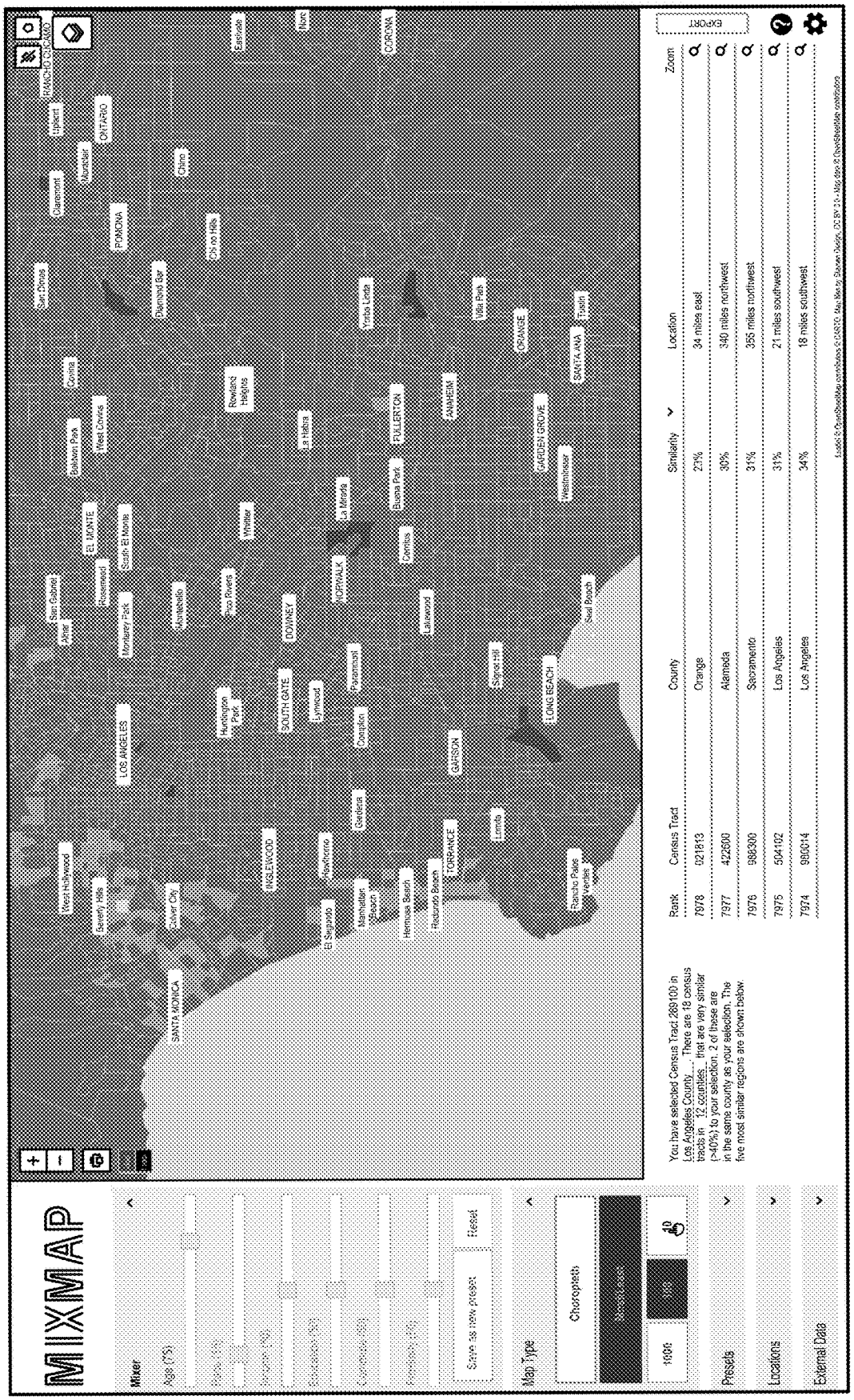
Figure 15:
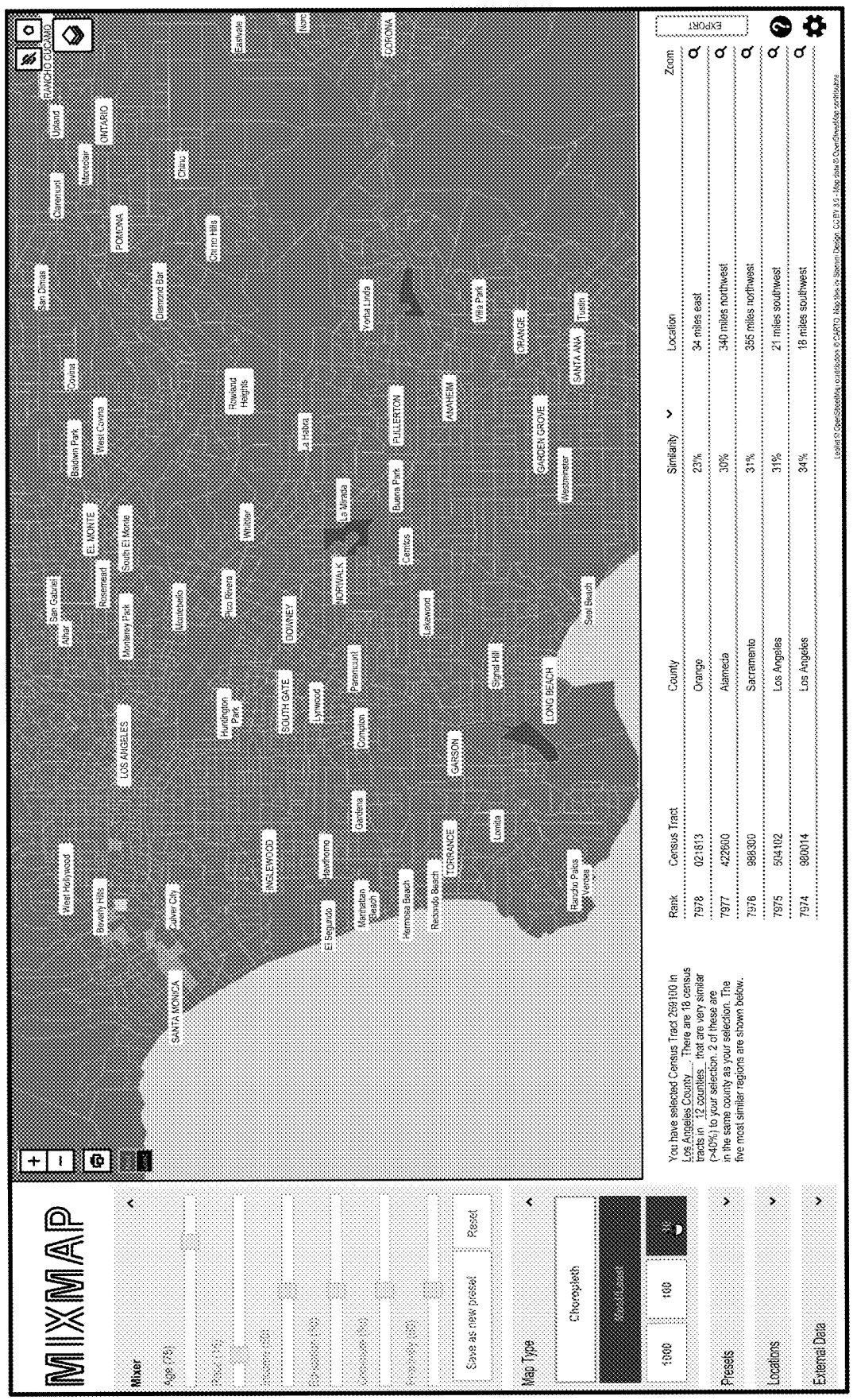

Some implementations display a table (e.g., the table 802 in the graphical user interface 800 in FIG. 8), which shows top ranked similar tracts. Each tract can be individually selected. Some implementations provide an icon (e.g., the icon 902 in the graphical user interface 900 in FIG. 9) for zooming into each tract or region. Some implementations also allow a user to sort based on similarity percentage (e.g., sorting the list in decreasing order of similarity allows the user to see least similar or dissimilar tracts), examples of which are shown in graphical user interfaces 1000 and 1100 shown in FIGS. 10 and 11. Some implementations provide a plurality of cartographic representations for displaying similarity. An example of this is shown in FIG. 12, which shows two options 1202 in the graphical user interface 1200. Some implementations support a choropleth map type where gradient is shown from most to least (e.g., the example map shown in FIG. 12). Some implementations support a map type where data is shown as most or least (e.g., the most 100, the least 10, or the most 1000) using two color palettes (e.g., the maps shown in the graphical user interfaces 1300, 1400, and 1500, in FIGS. 13, 14, and 15, respectively). Some implementations show different color coding for the most similar (e.g., red) and the least similar (e.g., blue).

Figure 16:
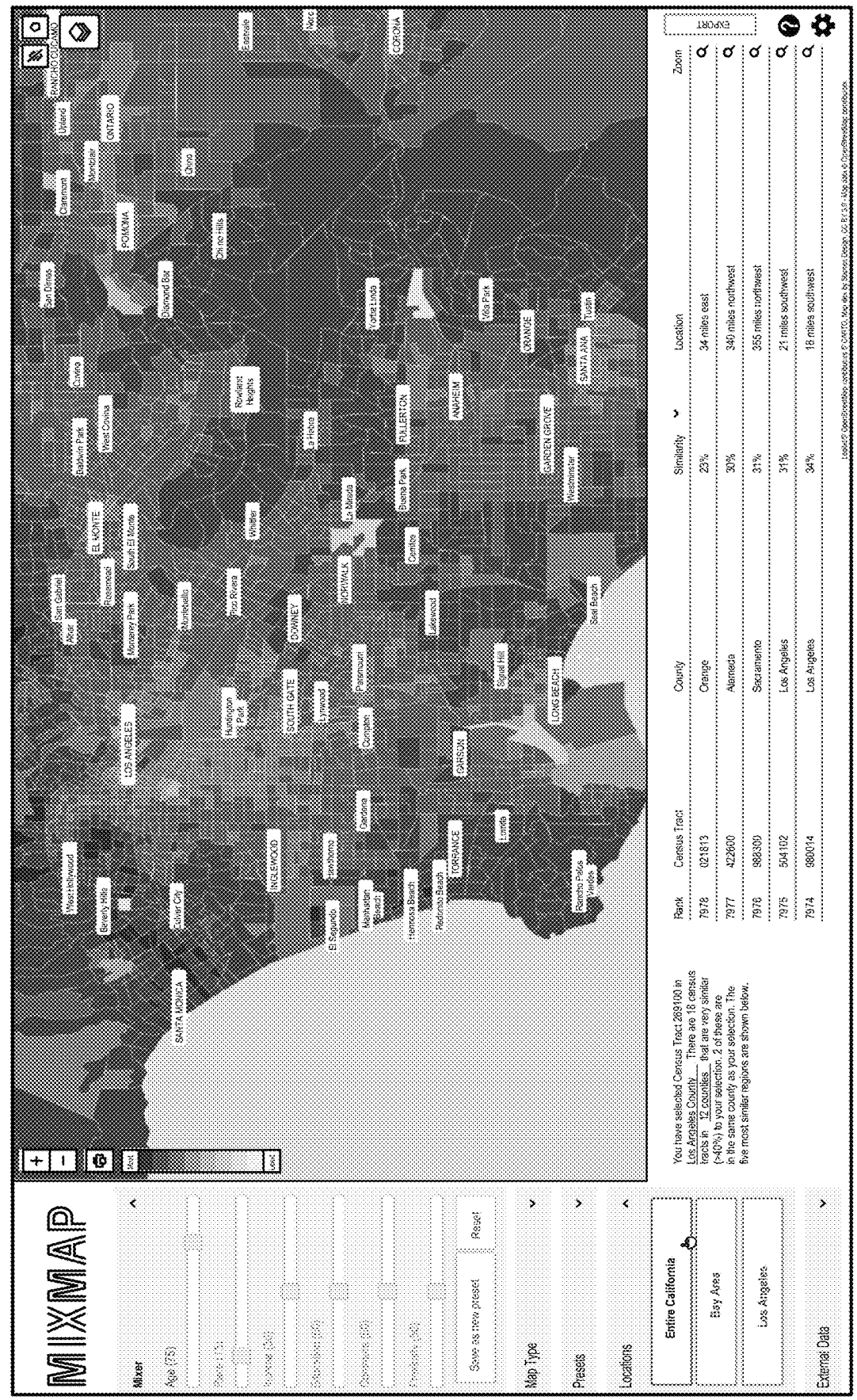
Figure 17A:
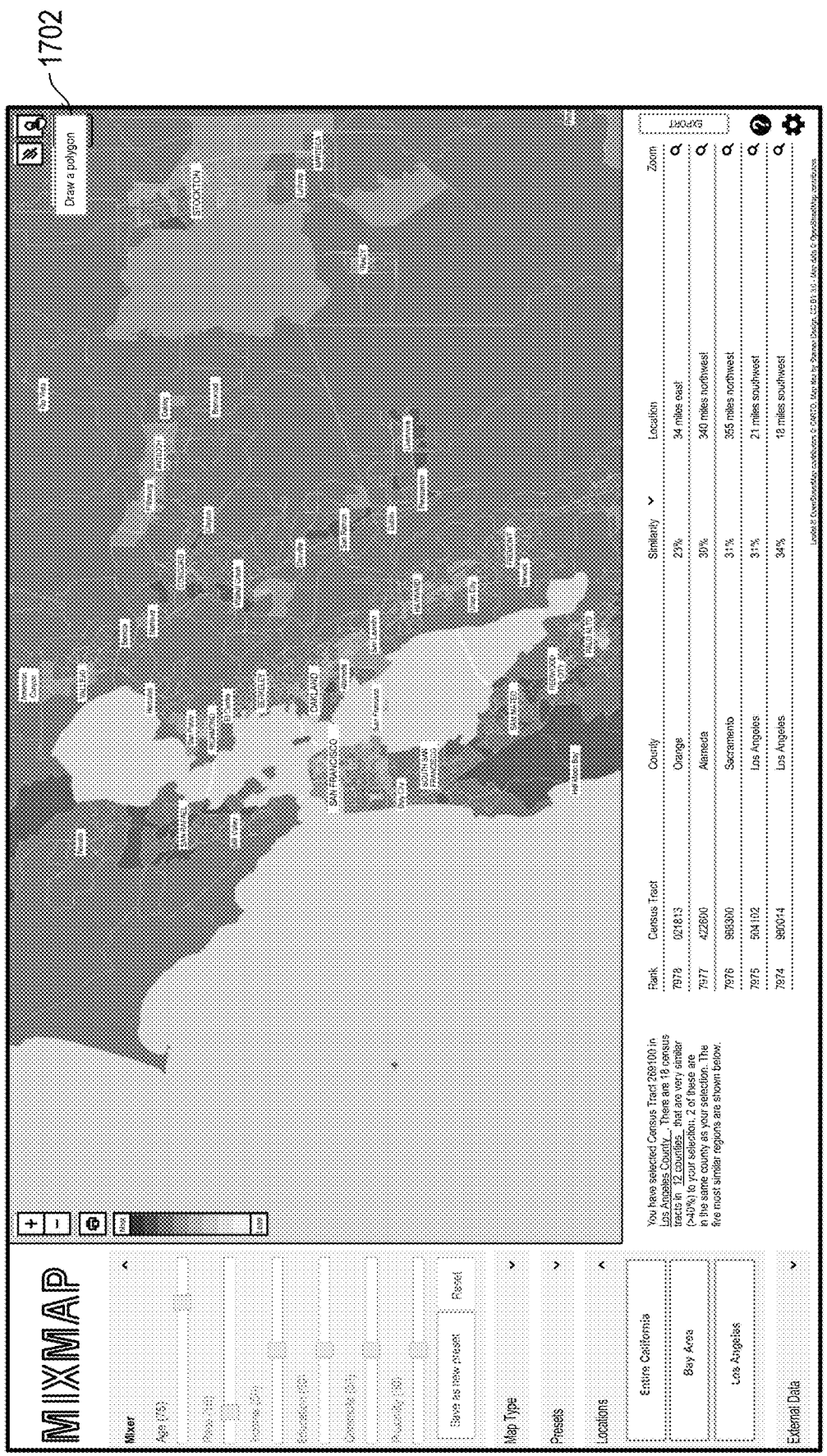
Figure 17B:
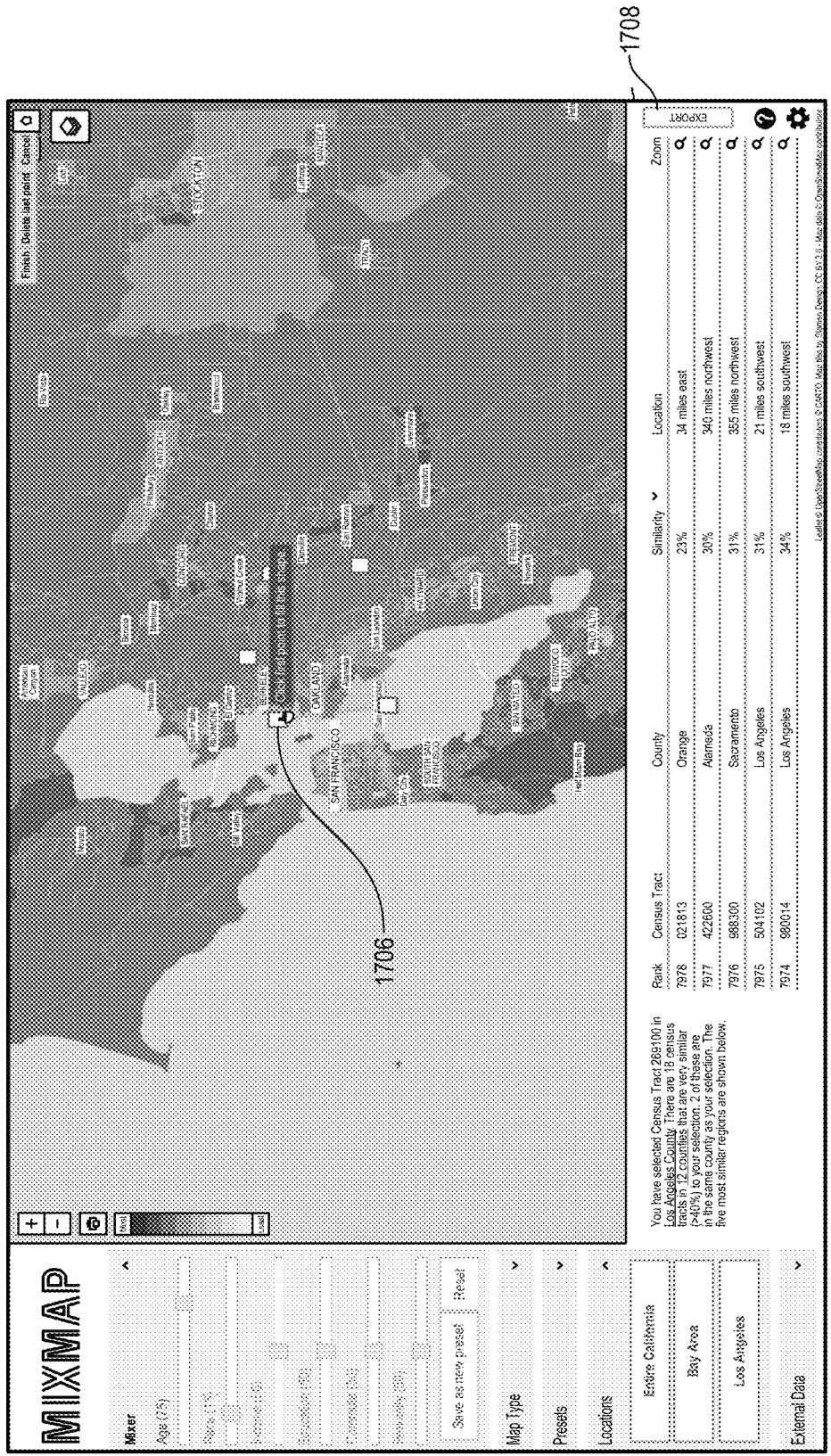
Figure 18:
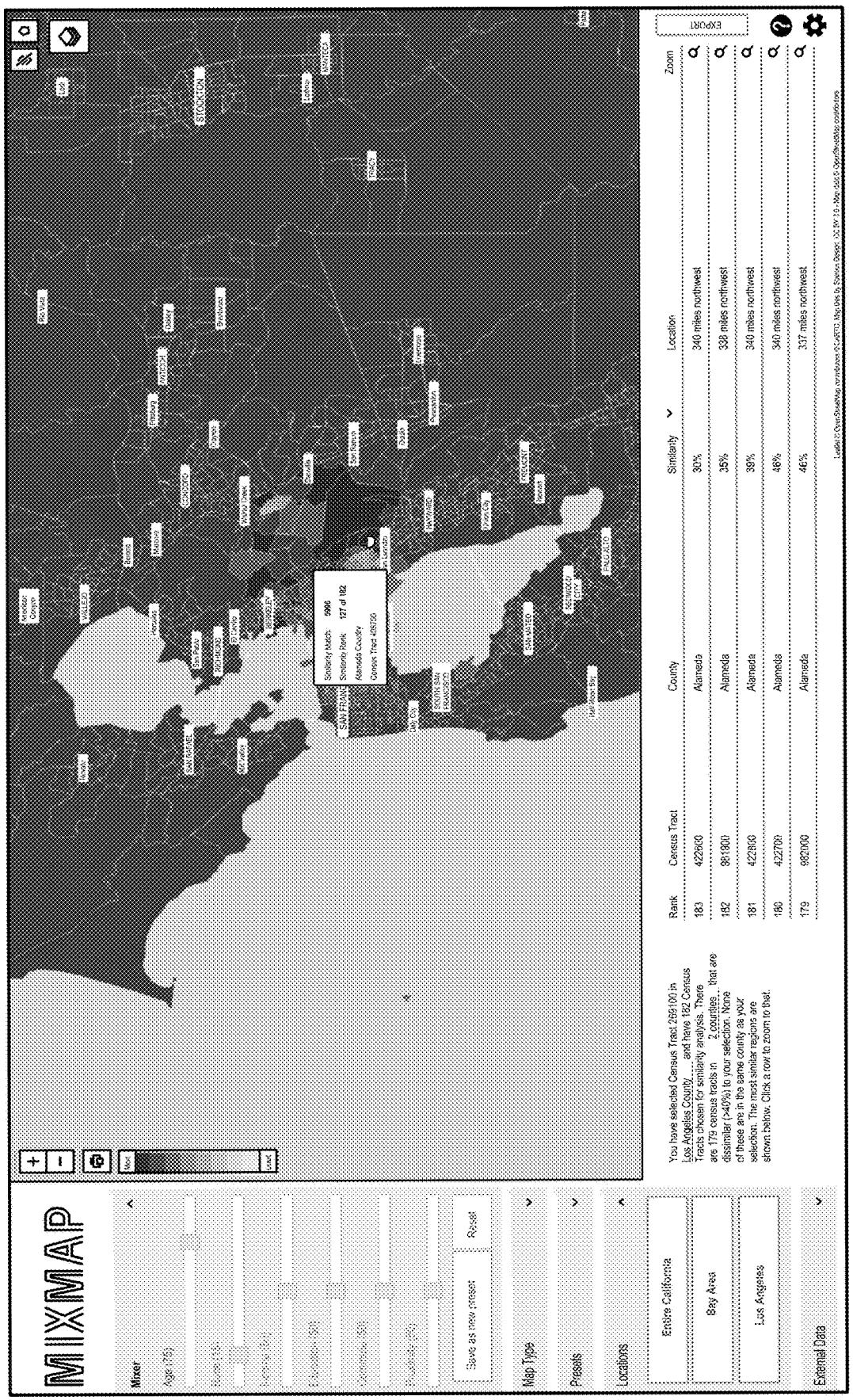
Figure 19:
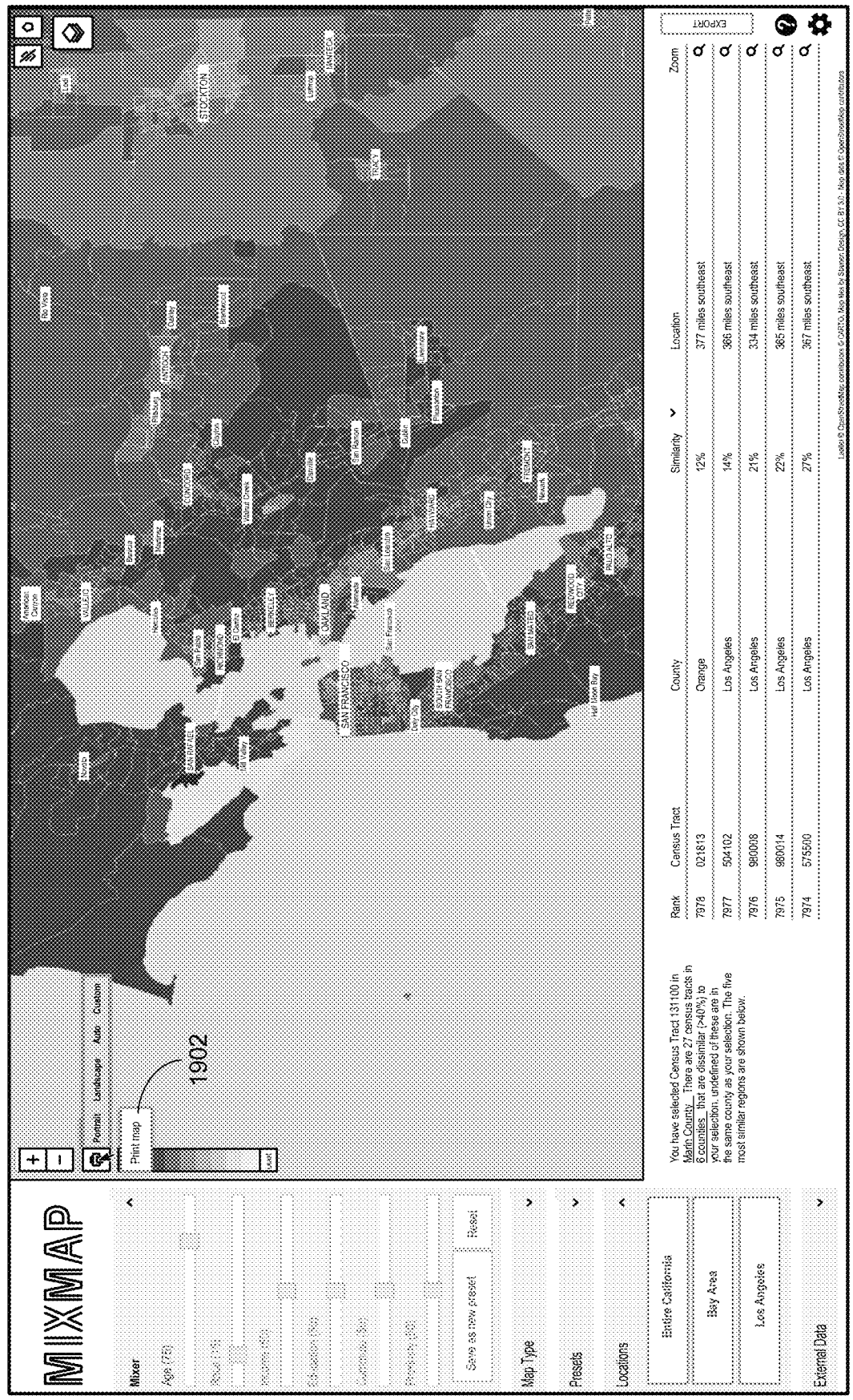

As shown in the graphical user interface 1600 in FIG. 16, some implementations show predetermined locations to choose from. Some implementations allow a user to add locations. Some implementations allow a user to draw a polygon on a map, an example of which is shown in the graphical user interface 1700 in FIG. 17A, which shows an affordance 1702 to allow a user to draw a polygon. When a user selects a region by drawing a polygon (e.g., by selecting different places on a map), similarity for the specific region is shown (e.g., similar tracts are shown). An example polygon 1706 is shown in the graphical user interface 1704 shown in FIG. 17B, according to some implementations. Some implementations allow exporting of data (e.g., by clicking on an affordance 1708) so the data can be analyzed outside of the interface. FIG. 18 shows a graphical user interface 1800 that is updated after the user selects a region by drawing a polygon (as described above), according to some implementations. As shown in the graphical user interface example 1900 in FIG. 19, some implementations provide an affordance 1902 to allow users to print the map after making adjustments.

Figure 21:
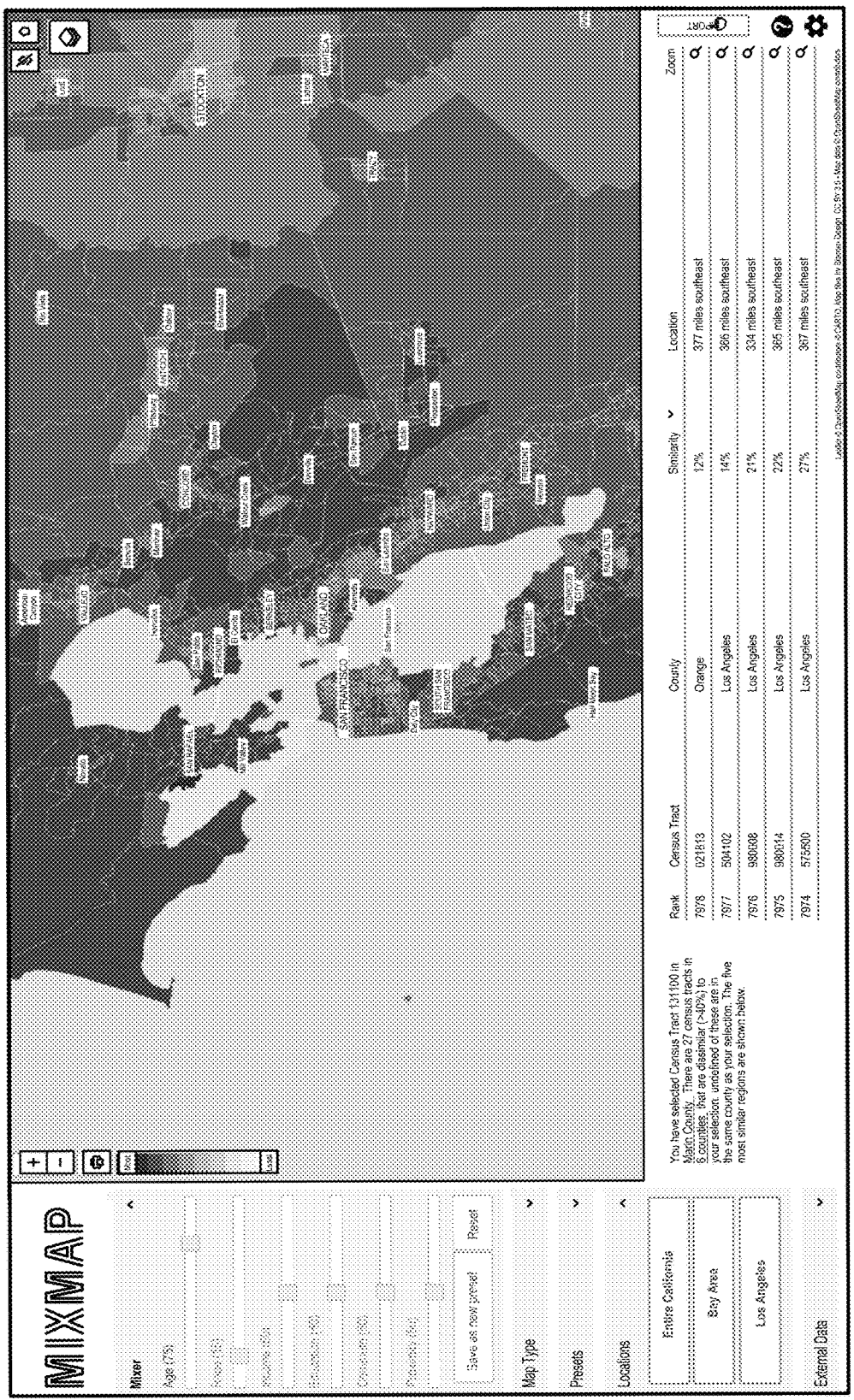
Figure 22:
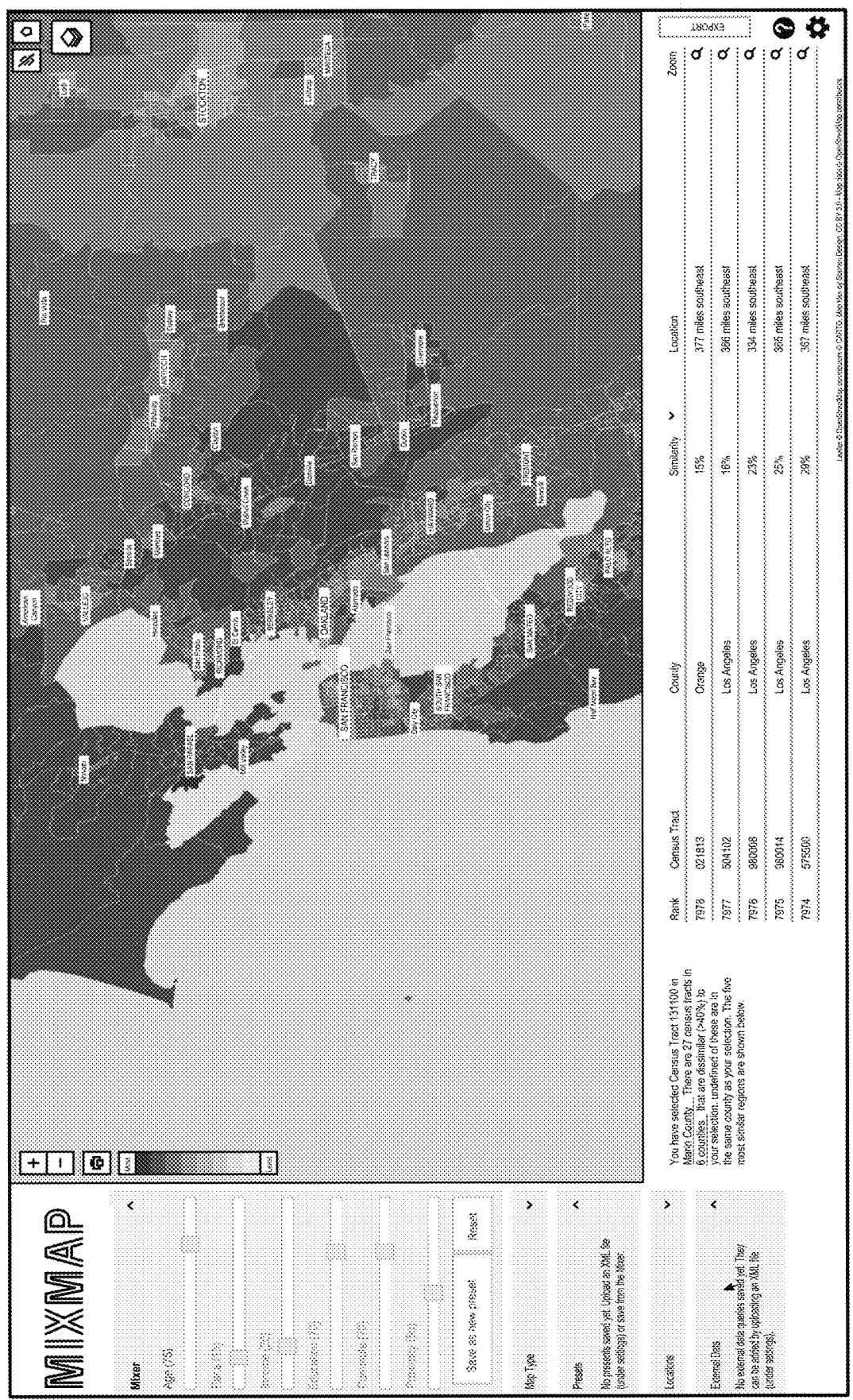
Figure 23:
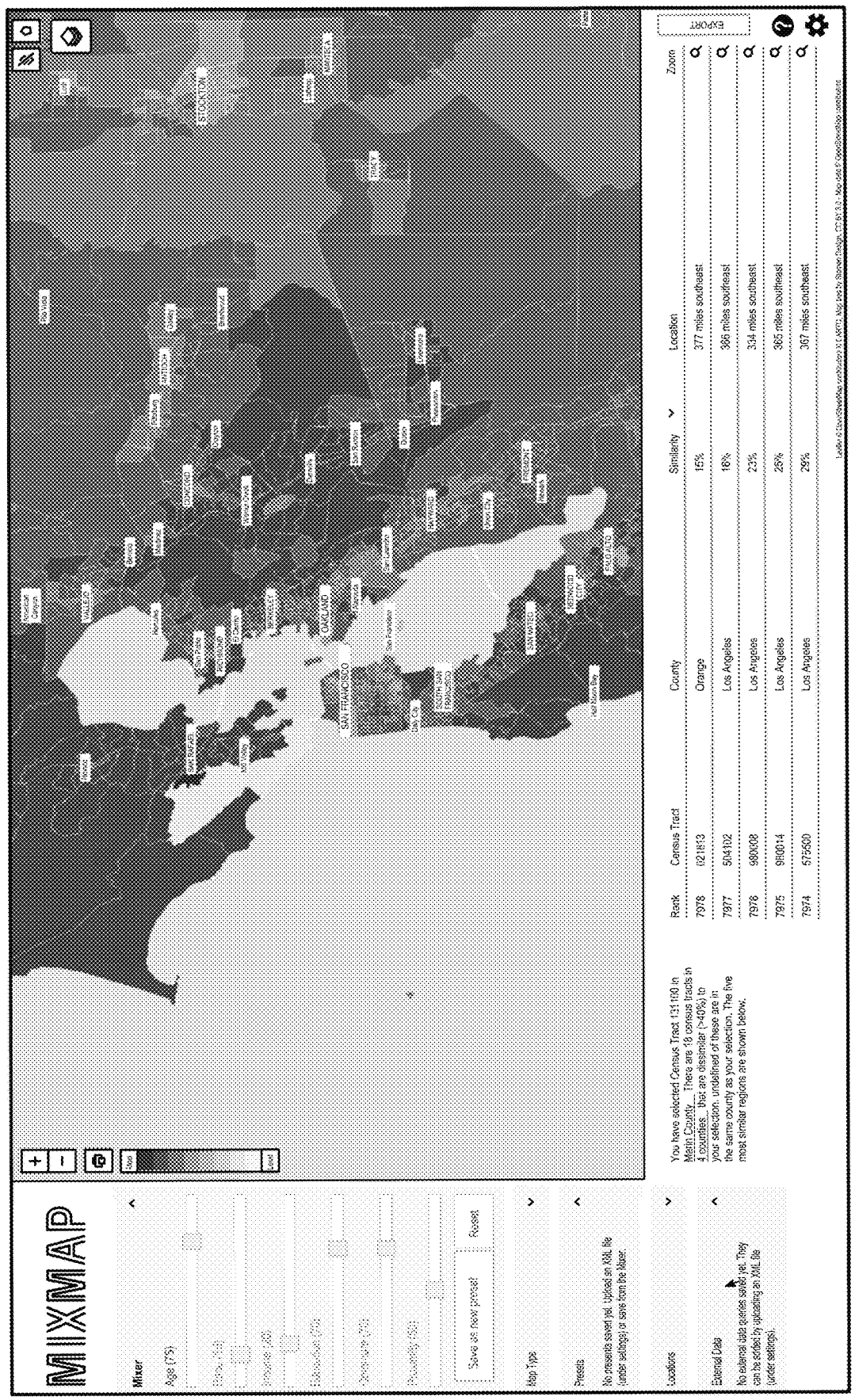
Figure 25:
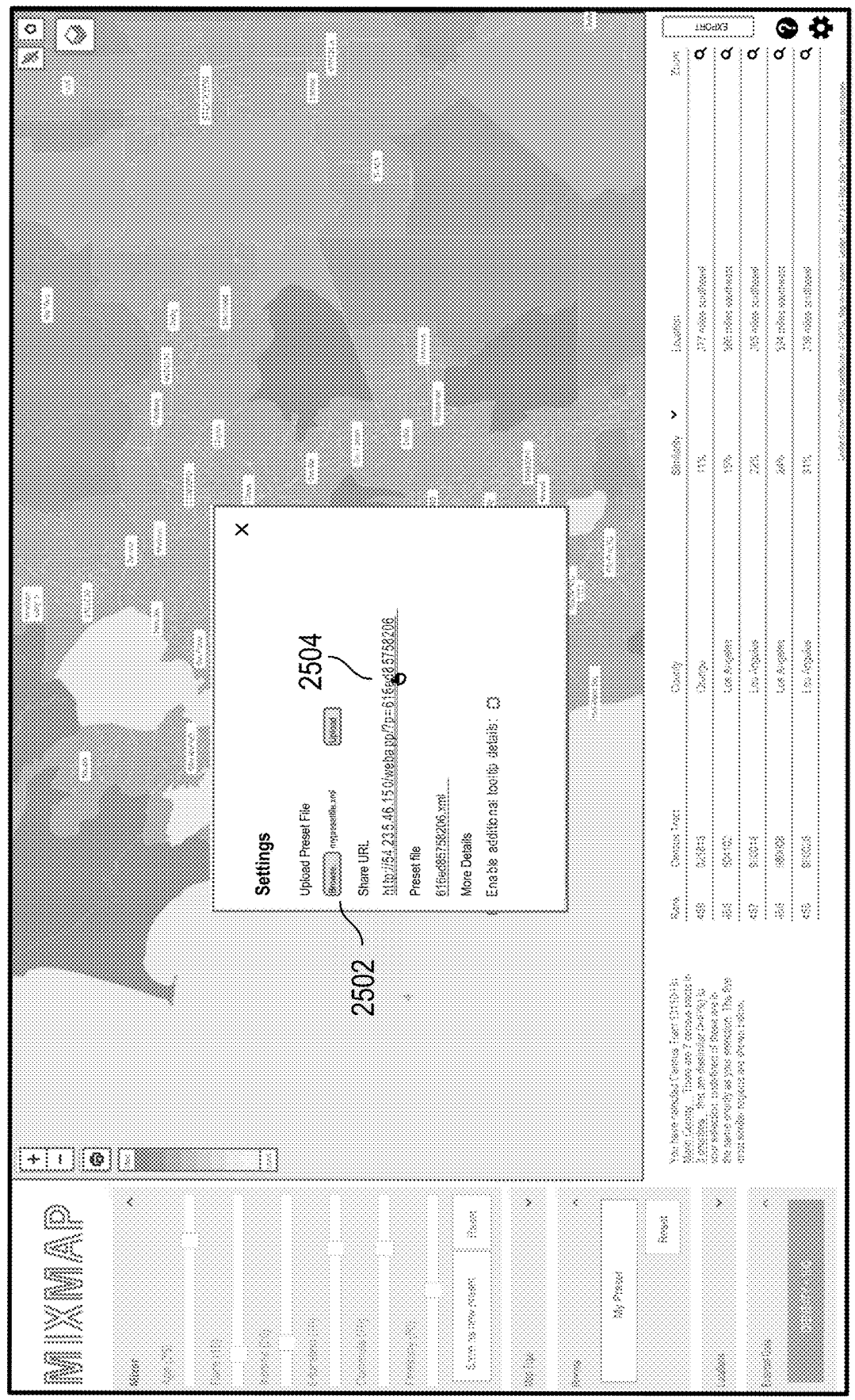
Figure 26:
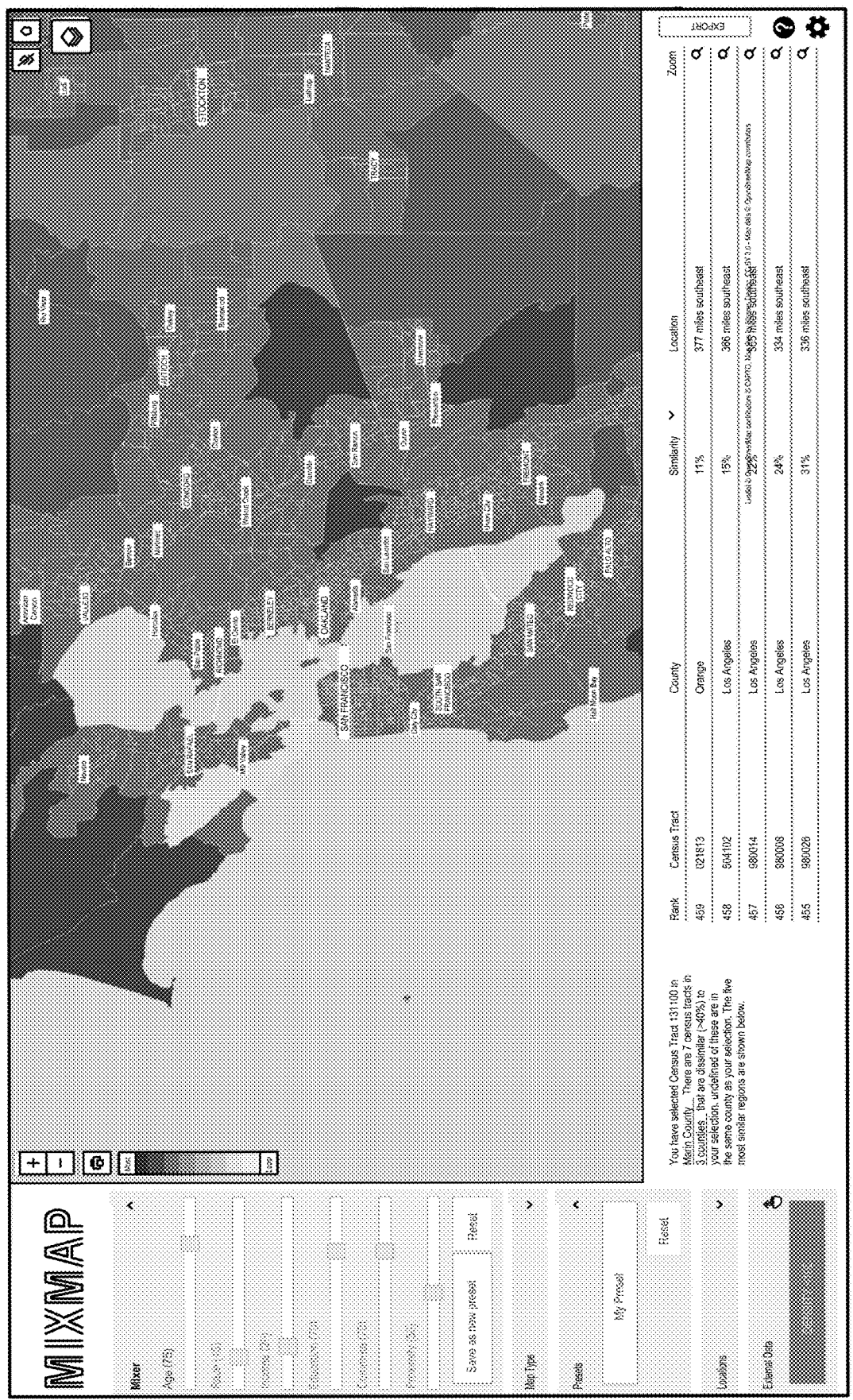
Figure 27:
Figure 28:
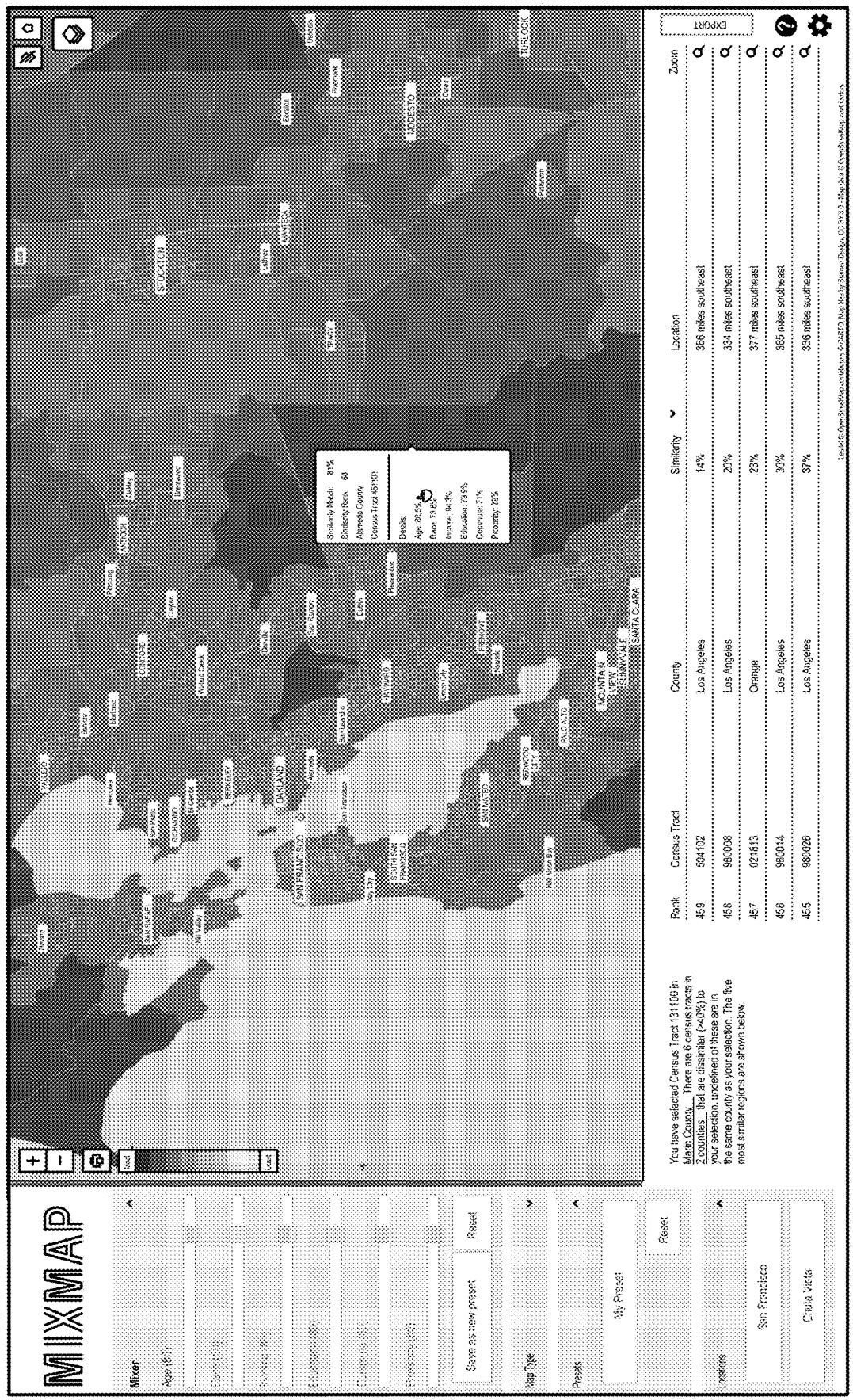

Some implementations provide "presets" so that users can restrict values (e.g., based on values in an external document), instead of manually changing mixers (e.g., selecting values for individual categories, by adjusting slider affordances), examples of which are shown in the graphical user interfaces 2100 (e.g., the portion 2102), 2200, and 2300, in FIGS. 21, 22, and 23, respectively. An example XML file 2400 is shown for illustration in FIG. 24, according to some implementations. The example shows location names specified, along with a density parameter (e.g., population density less than 100 people per square mile). Some implementations allow a user to upload a preset file, an example of which is shown in the graphical user interface 2500 in FIG. 25, where a preset file 2502 has been uploaded by a user. Some implementations allow users to share the external file using an URL (e.g., the URL for sharing 2504). When the external file is uploaded, the display is automatically updated to reflect values in the present file, according to some implementations. An example update is shown in the graphical user interface 2600 in FIG. 26, according to some implementations. Some implementations show a number of presets for a user to select from. Some implementations automatically update mixers (values for different categories) based on a selected preset. Some implementations allow a user to enable additional tooltip details, examples of which are shown in the graphical user interfaces 2700 and 2800, in FIGS. 27 and 28, respectively.

Figure 29:
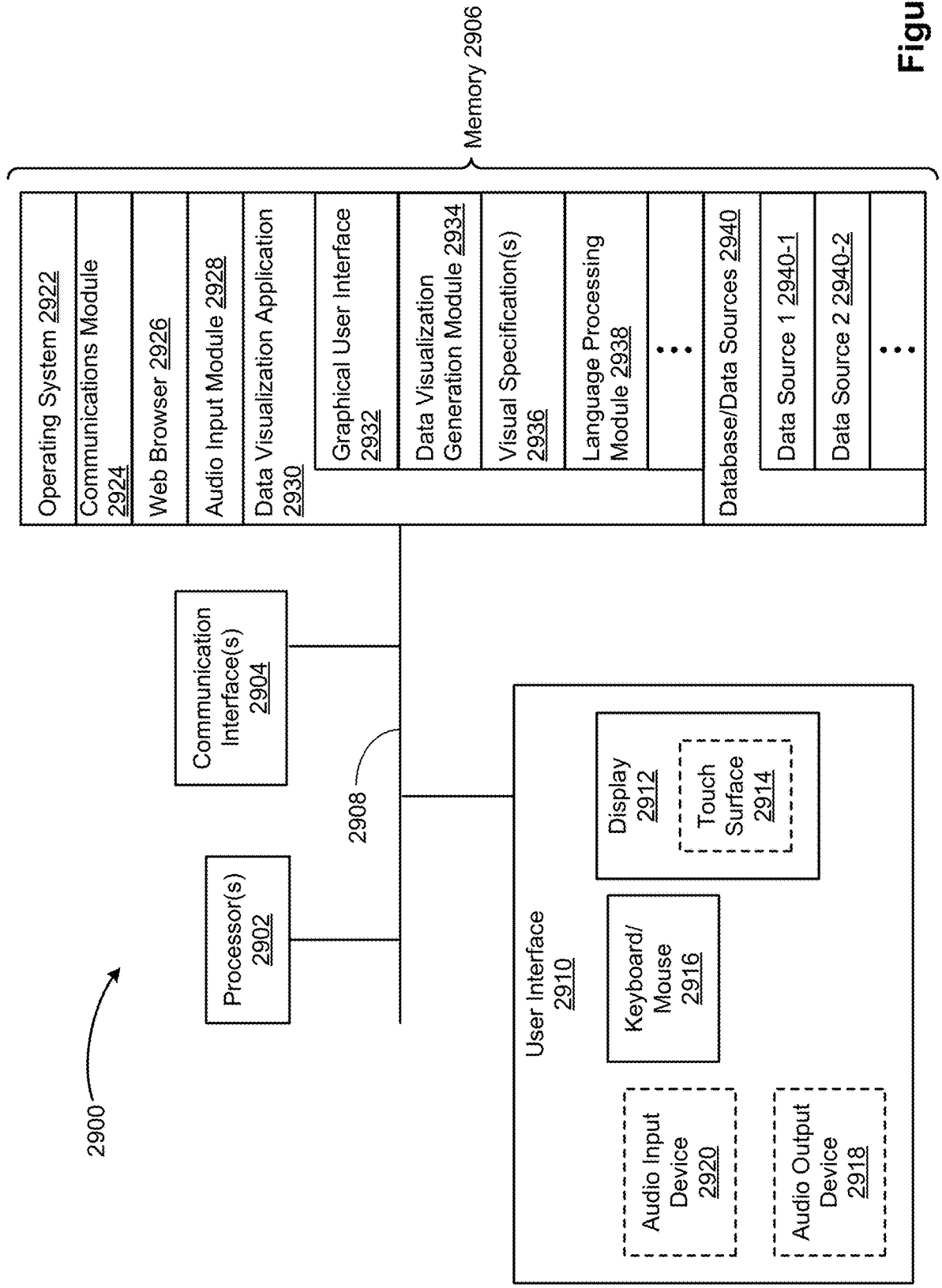
FIG. 29 is a block diagram of a computing device according to some implementations.

FIG. 29 is a block diagram illustrating a computing device 2900, which can display the graphical user interfaces described above in accordance with some implementations. Various examples of the computing device 2900 include a desktop computer, a laptop computer, a tablet computer, and other computing devices that have a display and a processor capable of running a data visualization application 2930. The computing device 2900 typically includes one or more processing units (processors or cores) 2902, one or more network or other communications interfaces 2904, memory 2906, and one or more communication buses 2908 for interconnecting these components. The communication buses 2908 optionally include circuitry (sometimes called a chipset) that interconnects and controls communications between system components. The computing device 2900 includes a user interface 2910. The user interface 2910 typically includes a display device 212. In some implementations, the computing device 2900 includes input devices such as a keyboard, mouse, and/or other input buttons 2916. Alternatively or in addition, in some implementations, the display device 2912 includes a touch-sensitive surface 2914, in which case the display device 2912 is a touch-sensitive display. In some implementations, the touch-sensitive surface 2914 is configured to detect various swipe gestures (e.g., continuous gestures in vertical and/or horizontal directions) and/or other gestures (e.g., single/double tap). In computing devices that have a touch-sensitive display 2914, a physical keyboard is optional (e.g., a soft keyboard may be displayed when keyboard entry is needed). The user interface 2910 also includes an audio output device 2918, such as speakers or an audio output connection connected to speakers, earphones, or headphones. Furthermore, some computing devices 2900 use a microphone and voice recognition to supplement or replace the keyboard. Optionally, the computing device 2900 includes an audio input device 2920 (e.g., a microphone) to capture audio (e.g., speech from a user).

The memory 2906 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 2906 includes one or more storage devices remotely located from the processor(s) 2902. The memory 2906, or alternatively the non-volatile memory device(s) within the memory 2906, includes a non-transitory computer-readable storage medium. In some implementations, the memory 2906 or the computer-readable storage medium of the memory 2906 stores the following programs, modules, and data structures, or a subset or superset thereof:

- an operating system 2922, which includes procedures for handling various basic system services and for performing hardware dependent tasks;
- a communications module 2924, which is used for connecting the computing device 2900 to other computers and devices via the one or more communication network interfaces 2904 (wired or wireless), such as the Internet, other wide area networks, local area networks, metropolitan area networks, and so on;

a web browser 2926 (or other application capable of displaying web pages), which enables a user to communicate over a network with remote computers or devices;

optionally, an audio input module 2928 (e.g., a microphone module) for processing audio captured by the audio input device 2920. The captured audio may be sent to a remote server and/or processed by an application executing on the computing device 2900 (e.g., the data visualization application 2930);

a data visualization application 2930 for generating data visualizations and related features. The application 2930 includes a graphical user interface 2932 for a user to construct visual graphics. For example, a user selects one or more data sources 2940 (which may be stored on the computing device 2900 or stored remotely), selects data fields from the data source(s), and uses the selected fields to define a visual graphic; and zero or more databases or data sources 2940 (e.g., a first data source 2940-1 and a second data source 2940-2), which are used by the data visualization application 2930. In some implementations, the data sources are stored as spreadsheet files, CSV files, text files, JSON files, XML, files, or flat files, or stored in a relational database.

In some implementations, the data visualization application 2930 includes a data visualization generation module 2934, which takes user input (e.g., a visual specification 2936), and generates a corresponding visual graphic. The data visualization application 2930 then displays the generated visual graphic in the user interface 2932. In some implementations, the data visualization application 2930 executes as a standalone application (e.g., a desktop application). In some implementations, the data visualization application 2930 executes within the web browser 2926 or another application using web pages provided by a web server (e.g., a server-based application).

In some implementations, the information the user provides (e.g., user input) is stored as a visual specification 2936. In some implementations, the visual specification 2936 includes previous natural language commands received from a user or properties specified by the user through natural language commands.

In some implementations, the data visualization application 2930 includes a language processing module 2938 for processing (e.g., interpreting) commands provided by a user of the computing device. In some implementations, the commands are natural language commands (e.g., captured by the audio input device 2920). In some implementations, the language processing module 2938 includes sub-modules, such as an autocomplete module, a pragmatics module, and an ambiguity module, each of which is discussed in further detail below.

In some implementations, the memory 2906 stores metrics and/or scores determined by the language processing module 2938. In addition, the memory 2906 may store thresholds and other criteria, which are compared against the metrics and/or scores determined by the language processing module 2938. For example, the language processing module 2938 may determine a relatedness metric (discussed in detail below) for an analytic word/phrase of a received command. Then, the language processing module 2938 may compare the relatedness metric against a threshold stored in the memory 2906.

Details of the various data structures and modules of the computing device 2900 are further described below in reference to FIG. 34, according to some implementations.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 2906 stores a subset of the modules and data structures identified above. Furthermore, the memory 2906 may store additional modules or data structures not described above.

Although FIG. 29 shows a computing device 2900, FIG. 29 is intended more as a functional description of the various features that may be present rather than as a structural schematic of the implementations described herein. In practice, and as recognized by those of ordinary skill in the art, items shown separately could be combined and some items could be separated.

Figure 34:
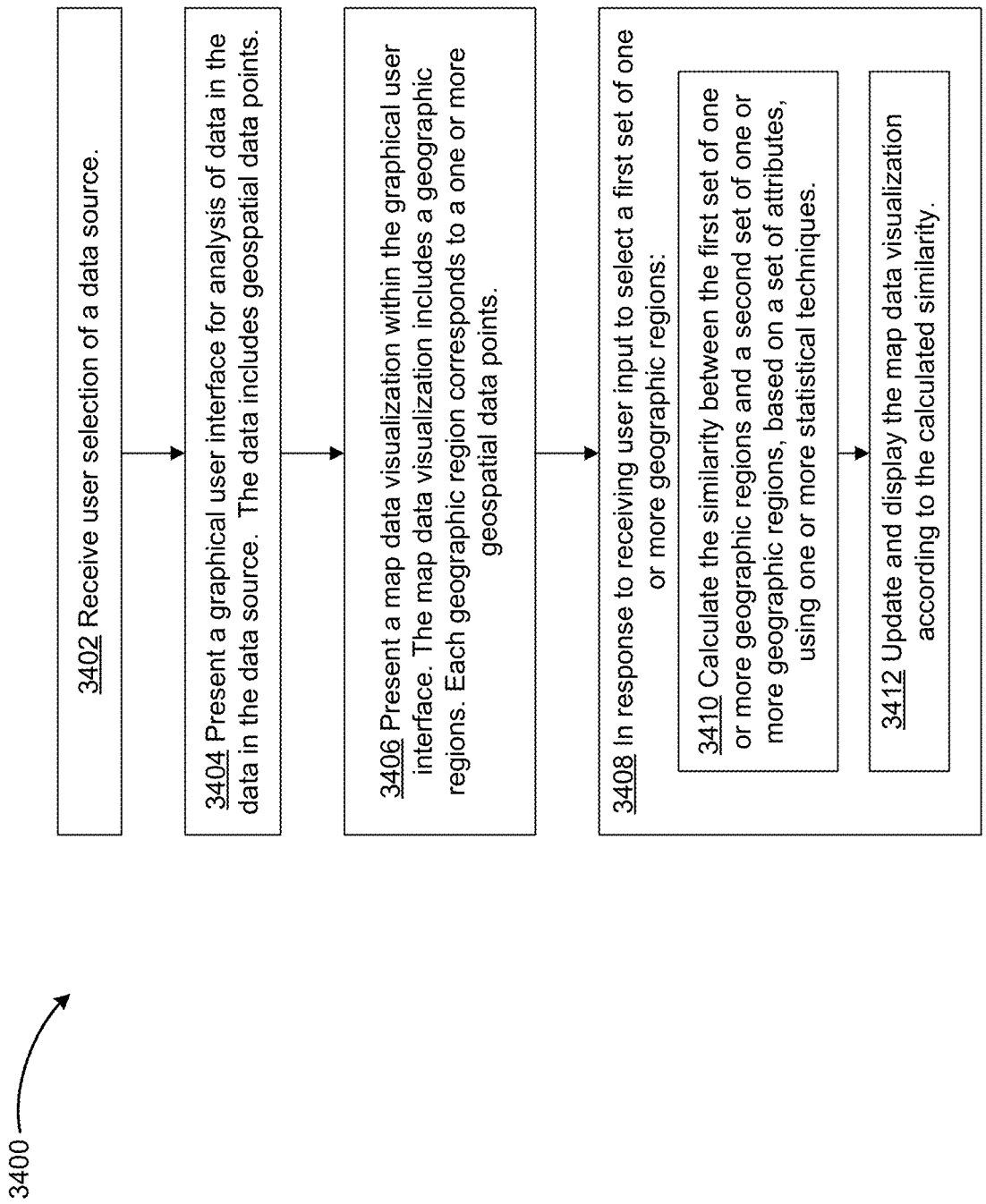
FIG. 34 shows a flowchart for an example method for visual analysis of data, according to some implementations.

FIG. 34 shows a flowchart for an example method 3400 for visual analysis of data, according to some implementations. The method 3400 is performed by the computing device 2900, using one or more modules in the memory 2906. A user selects a data source (e.g., the data source 2940-1). The computing device 2900 receives (3402) user selection (e.g., user selection via the user interface 2910) of a data source (e.g., the data source 2940-1). In response, the computing device 2900 (e.g., the data visualization generalization module 2934) presents (3404) a graphical user interface (e.g., the graphical user interface 2932, various examples of which are described above) for analysis of data in the data source. The data includes geospatial data points. The computing device 2900 also presents (3406) a map data visualization within the graphical user interface (e.g., the map data visualization 3102 within the graphical user interface 3100). The map data visualization includes a plurality of geographic regions (e.g., Census tracts). Each geographic region corresponds to a respective one or more geospatial data points.

In response (3408) to receiving a first user input to select a first set of one or more geographic regions of the plurality of the geographic regions, the computing device 2900 calculates (3410) a similarity between the first set of one or more geographic regions and a second set of one or more geographic regions of the plurality of geographic regions, based on a set of attributes (e.g., data fields from the selected data source), using one or more statistical techniques.

In some implementations, the set of attributes includes one or more socio-economic, demographic, and geographic variables. Examples of such attributes (sometimes referred to as dimensions) are described above in reference to the example mixer widget. A Census tract, for example, may include a plurality of dimensions. In some implementations, each attribute of the set of attributes is associated with a corresponding weight of a plurality of weights, and the method further includes calculating the similarity based on the plurality of weights. In some implementations, the method 3400 further includes providing one or more affordances, each affordance corresponding to a respective attribute of the set of attributes. In some implementations, the method further includes, in response to receiving a second user input to select a first affordance of the one or more affordances: (i) adjusting a first weight corresponding to a first attribute corresponding to the first affordance to obtain an updated set of weights; (ii) calculating an updated similarity between the first one or more geographic regions and the second one or more geographic regions, based on the updated set of weights, using the one or more statistical techniques; and (iii) updating and displaying (3412) the map data visualization according to the updated similarity. Examples of these steps are described above in reference to the mixer widget, according to some implementations. In some implementations, the method 3400 further includes: (i) providing a store affordance to store the updated set of weights; and (ii) in response to a user selecting the store affordance, storing the updated set of weights in a preset file for a next session. In some implementations, the method 3400 further includes, for the next session, retrieving the preset file and using the updated set of weights for calculating the similarity between the first set of one or more geographic regions and the second set of one or more geographic regions. Examples of use of a preset file are described above in reference to the preset widget, according to some implementations.

In some implementations, the method 3400 further includes, in response to receiving a second user input to select coordinates for a search polygon on the map data visualization, defining the second set of one or more regions based on the coordinates. In some implementations, the method further includes comparing the coordinates for the search polygon to corresponding geospatial data points for each of the geographic regions of the plurality of geographic regions, to identify the second set of one or more geographic regions. Examples for using a search polygon (sometimes referred to as a draw polygon) are described above in reference to FIGS. 17A, 17B, 20A and 20B, according to some implementations.

Referring back to FIG. 34, the computing device 2900 updates and displays (3412) the map data visualization according to the calculated similarity. For example, the data visualization generation module 2934 may update and display the map data visualization according to the similarity calculated in the earlier step. In some implementations, updating the map data visualization includes highlighting or lowlighting at least one geographic region of the second one or more geographic regions. An example of such highlighting or lowlighting is described above in reference to FIG. 4, according to some implementations.

In some implementations, the map data visualization includes a choropleth map, and updating and displaying the map data visualization according to the calculated similarity includes displaying a gradient from most to least similarity. In some implementations, the method 3400 further includes: (i) providing a first affordance to select a choropleth map and a second affordance to select a most-least map; (ii) in response to a user selection of the first affordance, displaying a gradient from most to least similarity; and (iii) in response to a user selection of the second affordance, displaying most similar and least similar regions.

In some implementations, the method 3400 further includes: (i) providing a plurality of affordances, each affordance corresponding to a respective maximum number of regions; and (ii) in response to a user selection of an affordance of the plurality of affordances, displaying most similar and least similar regions within the second one or more regions based on the maximum number of regions corresponding to the affordance.

In some implementations, the method 3400 further includes: (i) providing a plurality of affordances, each affordance corresponding to a respective subset of subregions of the plurality of subregions; and (ii) in response to a user selection of an affordance of the plurality of affordances, (a) ceasing to present the map data visualization and (b) presenting an alternate map data visualization within the graphical user interface. The alternate map data visualization includes a subset of subregions corresponding to the affordance.

In some implementations, the graphical user interface includes a first portion and a second portion. The method 3400 further includes displaying the map data visualization in the first portion and displaying a summary of the similarity between the first one or more geographic regions and the second one or more geographic regions in the second portion. For example, in FIG. 31, the graphical user interface 3100 includes a first portion for showing the map data visualization 3102, and a second portion labeled G for showing a summary.

In some implementations, each of the geographic region corresponds to a respective census tract.

In some implementations, calculating the similarity includes computing a semantic similarity matrix for the first one or more geographic regions and the second one or more geographic regions of the plurality of geographic regions, for the set of attributes.

In some implementations, calculating the similarity includes computing Jensen-Shannon Divergence (JSD) between pairs of geographic regions of the first one or more geographic regions and the second one or more geographic regions.

In this way, the techniques described herein support a user-driven approach for determining the similarity of geographic regions during an analytical workflow. Users are able to select an arbitrary location of interest and the system compares the socio-economic and demographic characteristics of the region to these characteristics in all other geographic regions in a given administrative area, with the goal of identifying similar and dissimilar locations. Some implementations allow users to tune the parameters of the similarity model that can be saved as a preset file for future analysis. Some implementations provide intuitive, configurable affordances for exploring place similarity to help users make relevance judgments on the geographic features that they are comparing against.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of visual analysis of datasets, comprising:
at a computing system having one or more processors and memory storing one or more programs configured for execution by the one or more processors:
receiving user selection of a data source;
presenting a graphical user interface for analysis of data in the data source, wherein the data includes geospatial data points;
presenting a map data visualization within the graphical user interface, wherein the map data visualization includes a plurality of geographic regions, each geographic region corresponding to a respective one or more geospatial data points; and
in response to receiving a first user input to select a first set of one or more geographic regions of the plurality of geographic regions:
calculating a similarity between the first set of one or more geographic regions and a second set of one or more geographic regions of the plurality of geographic regions, based on a set of data fields from the data source, using one or more statistical techniques; and
updating and displaying the map data visualization according to the calculated similarity.

2. The method of claim 1, wherein the set of data fields comprises one or more socio-economic, demographic, and geographic variables.

3. The method of claim 1, wherein updating the map data visualization comprises highlighting or lowlighting at least one geographic region of the second one or more geographic regions.

4. The method of claim 1, further comprising:
in response to receiving a second user input to select coordinates for a search polygon on the map data visualization:
defining the second one or more regions based on the coordinates.

5. The method of claim 4, further comprising:
comparing the coordinates for the search polygon to corresponding geospatial data points for each of the geographic regions of the plurality of geographic regions, to identify the second set of one or more geographic regions.

6. The method of claim 1, wherein each data field of the set of data fields is associated with a corresponding weight of a plurality of weights, the method further comprising
calculating the similarity based on the plurality of weights.

7. The method of claim 6, further comprising:
providing one or more affordances, each affordance corresponding to a respective data field of the set of data fields.

8. The method of claim 7, further comprising:
in response to receiving a second user input to select a first affordance of the one or more affordances:
adjusting a first weight corresponding to a first attribute corresponding to the first affordance to obtain an updated set of weights;
calculating an updated similarity between the first one or more geographic regions and the second one or more regions, based on the updated set of weights, using the one or more statistical techniques; and
updating and displaying the map data visualization according to the updated similarity.

9. The method of claim 8, further comprising:
providing a store affordance to store the updated set of weights;
in response to a user selecting the store affordance:
storing the updated set of weights in a preset file for a next session.

10. The method of claim 9, further comprising:
for the next session, retrieving the preset file and using the updated set of weights for calculating the similarity between the first set of one or more geographic regions and the second set of one or more geographic regions.

11. The method of claim 1, wherein the map data visualization comprises a choropleth map, and wherein updating and displaying the map data visualization according to the calculated similarity comprises displaying a gradient from most to least similarity.

12. The method of claim 1, further comprising:
providing a first affordance to select a choropleth map and a second affordance to select a most-least map;
in response to user selection of the first affordance, displaying a gradient from most to least similarity; and
in response to user selection of the second affordance, displaying most similar and least similar regions.

13. The method of claim 1, further comprising:
providing a plurality of affordances, each affordance corresponding to a respective maximum number of regions; and
in response to a user selection of an affordance of the plurality of affordances, displaying most similar and least similar regions within the second one or more regions based on a maximum number of regions corresponding to the affordance.

14. The method of claim 1, further comprising:
providing a plurality of affordances, each affordance corresponding to a respective subset of subregions of the plurality of subregions; and
in response to user selection of an affordance of the plurality of affordances:
ceasing to present the map data visualization; and
presenting an alternate map data visualization within the graphical user interface, wherein the alternate map data visualization includes a subset of subregions corresponding to the affordance.

15. The method of claim 1, wherein the graphical user interface includes a first portion and a second portion, the method further comprising:
displaying the map data visualization in the first portion; and
displaying a summary of the similarity between the first one or more geographic regions and the second one or more geographic regions in the second portion.

16. The method of claim 1, wherein each of the geographic regions corresponds to a respective census tract.

17. The method of claim 1, wherein calculating the similarity comprises computing a semantic similarity matrix for the first set of one or more geographic regions and the second set of one or more geographic regions of the plurality of geographic regions, for the set of data fields.

18. The method of claim 1, wherein calculating the similarity comprises computing Jensen-Shannon Divergence (JSD) between pairs of geographic regions of the first set of one or more geographic regions and the second set of one or more geographic regions.

19. A computer system for visual analysis of datasets, comprising:
one or more processors; and
memory;

wherein the memory stores one or more programs configured for execution by the one or more processors, and the one or more programs comprising instructions for:

receiving user selection of a data source;

presenting a graphical user interface for analysis of data in the data source, wherein the data includes geospatial data points;

presenting a map data visualization within the graphical user interface, wherein the map data visualization includes a plurality of geographic regions, each geographic region corresponding to a respective one or more geospatial data points; and in response to receiving a first user input to select a first set of one or more geographic regions of the plurality of geographic regions:

calculating a similarity between the first set of one or more geographic regions and a second set of one or more geographic regions of the plurality of geographic regions, based on a set of data fields from the data source, using one or more statistical techniques; and updating and displaying the map data visualization according to the calculated similarity.

20. A non-transitory computer readable storage medium storing one or more programs configured for execution by a computer system having a display, one or more processors, and memory, the one or more programs comprising instructions for:

receiving user selection of a data source;

presenting a graphical user interface for analysis of data in the data source, wherein the data includes geospatial data points;

presenting a map data visualization within the graphical user interface, wherein the map data visualization includes a plurality of geographic regions, each geographic region corresponding to a respective one or more geospatial data points; and in response to receiving a first user input to select a first set of one or more geographic regions of the plurality of geographic regions:

calculating a similarity between the first set of one or more geographic regions and a second set of one or more geographic regions of the plurality of geographic regions, based on a set of data fields from the data source, using one or more statistical techniques; and updating and displaying the map data visualization according to the calculated similarity.

* * * * *